United States Patent
Froy

(10) Patent No.: US 10,013,061 B2
(45) Date of Patent: Jul. 3, 2018

(54) TEMPERATURE BASED HAPTIC FEEDBACK ON A GAMING TERMINAL DISPLAY

(71) Applicant: IGT Canada Solutions ULC, Moncton (CA)

(72) Inventor: David Froy, Lakeville (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 0 days.

(21) Appl. No.: 14/969,156

(22) Filed: Dec. 15, 2015

(65) Prior Publication Data
US 2017/0168570 A1 Jun. 15, 2017

(51) Int. Cl.
G06F 3/01 (2006.01)
G06F 3/041 (2006.01)
G06F 3/0484 (2013.01)
G07F 17/32 (2006.01)

(52) U.S. Cl.
CPC ............ G06F 3/016 (2013.01); G06F 3/0416 (2013.01); G06F 3/04842 (2013.01); G07F 17/3209 (2013.01)

(58) Field of Classification Search
CPC .......... G06F 3/041–3/047; G06F 3/016; G06F 2203/04101–2203/04113
USPC ......... 345/173–178; 178/18.01–18.09, 18.11
See application file for complete search history.

(56) References Cited

U.S. PATENT DOCUMENTS

| | | | | |
|---|---|---|---|---|
| 2002/0160827 A1* | 10/2002 | Slomiany | ................ | G07F 17/32 463/16 |
| 2009/0303175 A1* | 12/2009 | Koivunen | ............... | A63F 13/10 345/156 |
| 2013/0027320 A1* | 1/2013 | Chang | .................. | G09B 21/007 345/173 |
| 2013/0217491 A1* | 8/2013 | Hilbert | .................... | A63F 13/00 463/31 |
| 2013/0222280 A1* | 8/2013 | Sheynblat | ............... | G06F 3/016 345/173 |
| 2015/0324049 A1* | 11/2015 | Kies | ...................... | G06F 3/0414 345/156 |

OTHER PUBLICATIONS

Willfahrt, Andreas; Screen Printed Thermoelectric Devices, Linköping Studies in Science and Technology Licentiate Thesis No. 1663, Dept. of Science and Technology Linköping University, LiU Norrköping SE-601 74 Norrköping, 2014.

* cited by examiner

*Primary Examiner* — Stephen G Sherman
(74) *Attorney, Agent, or Firm* — Sage Patent Group

(57) ABSTRACT

An electronic gaming machine (EGM) for providing haptic feedback to a player is provided. The EGM includes a touchscreen having a touchscreen surface. The EGM also includes a heating device coupled to the touchscreen to selectively radiate heat from the touchscreen surface. The EGM further includes a processor coupled to the touchscreen and to the heating device. The processor may be configured to detect a game condition associated with the game and, in response to detecting the game condition, control the heating device to set a level of heat radiating from the touchscreen surface.

19 Claims, 15 Drawing Sheets

TEMPERATURE BASED HAPTIC FEEDBACK ON A GAMING TERMINAL DISPLAY

TECHNICAL FIELD

The present disclosure relates generally to electronic gaming systems, such as casino gaming terminals. More specifically, the present disclosure relates to methods and systems for providing haptic feedback on electronic gaming systems.

BACKGROUND

Gaming terminals and systems, such as casino-based gaming terminals, often include a variety of physical input mechanisms which allow a player to provide instructions to the gaming terminal. For example, slot machines are often equipped with a lever or one or more buttons which cause the machine to initiate a spin of a plurality of reels.

Modern day gaming terminals are often electronic devices. The modern day gaming terminals may include a touchscreen display. The touchscreen display provides a display interface to a player and receives touchscreen input from the player. Further, modern day gaming terminals often include one or more speakers. While modern day gaming terminals can provide an immersive visual and audio experience, such gaming terminals typically only provide visual and audible feedback. There is a need for improved gaming terminals.

BRIEF DESCRIPTION OF THE DRAWINGS

Reference will now be made, by way of example, to the accompanying drawings which show an embodiment of the present application, and in which.

Similar reference numerals are used in different figures to denote similar components.

DETAILED DESCRIPTION OF EXAMPLE EMBODIMENTS

There is described an electronic gaming machine (EGM) for providing haptic feedback to a player. The EGM includes a touchscreen having a touchscreen surface. The EGM also includes a heating device coupled to the touchscreen to selectively radiate heat from the touchscreen surface. The EGM further includes a processor coupled to the touchscreen and to the heating device. The processor is configured to detect a game condition associated with the game and, in response to detecting the game condition, control the heating device to set a level of heat radiating from the touchscreen surface.

In another aspect, there is described a method for providing a game to a player at an electronic gaming machine. The electronic gaming machine includes a touchscreen having a touchscreen surface and a heating device coupled to the touchscreen to selectively radiate heat from the touchscreen surface. The method includes detecting a game condition associated with the game and, in response to detecting the game condition, controlling the heating device to set a level of heat radiating from the touchscreen surface.

In another aspect, there is described a non-transitory computer readable medium containing instructions which, when executed, cause a processor to detect a game condition associated with a game and, in response to detecting the game condition, control the heating device to set a level of heat radiating from the touchscreen surface.

Other aspects and features of the present application will become apparent to those ordinarily skilled in the art upon review of the following description of specific embodiments of the application in conjunction with the accompanying figures.

Figure 1:
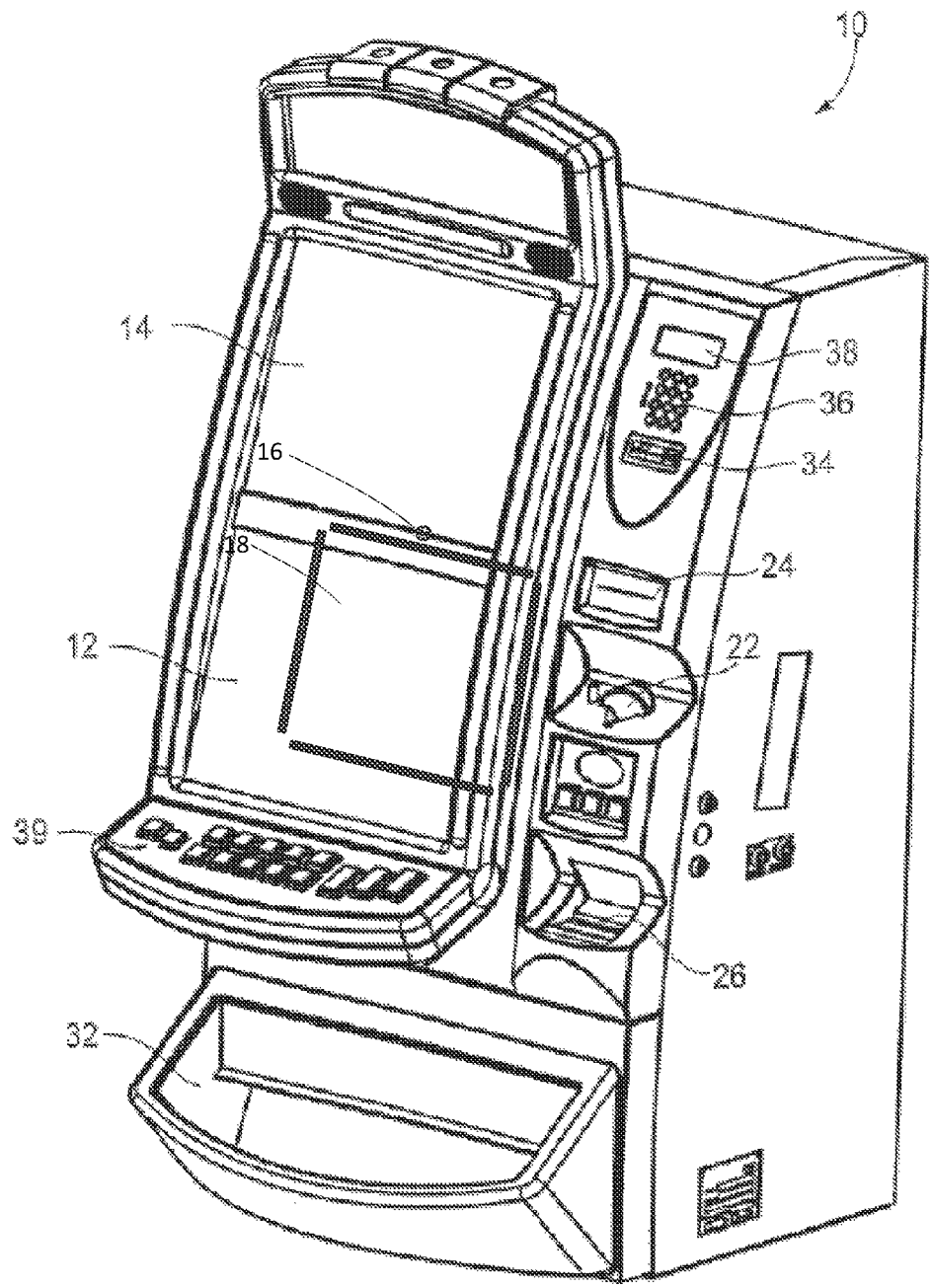
FIG. 1 illustrates an example electronic gaming machine (EGM) in accordance with example embodiments of the present disclosure.

The embodiments described herein may be included in any one of a number of possible gaming systems including, for example, a computer, a mobile device such as a smart phone or tablet computer, a casino-based gaming terminal, a virtual reality terminal or gaming devices of other types. In at least some embodiments, the gaming system may be connected to the Internet via a communication path such as a Local Area Network (LAN) and/or a Wide Area Network (WAN). In at least some embodiments, the gaming improvements described herein may be included in an Electronic Gaming Machine (EGM). An EGM 10 in accordance with example embodiments of the present disclosure is illustrated in FIG. 1. The techniques described herein may also be applied to other electronic devices that are not gaming systems.

Reference is now made to FIG. 1 which is an example electronic gaming machine (EGM). The EGM 10 is configured to provide haptic feedback to a user at a display 12. In some embodiments, the display 12 may be a touchscreen. The touchscreen may have a touchscreen surface 18. The haptic feedback may be provided using varying degrees or levels of heat radiating from the touchscreen surface 18.

The EGM 10 includes a display 12. The display 12 may be of a variety of different display types including, for example, a thin film transistor (TFT) display, a liquid crystal display (LCD), a cathode ray tube (CRT), a light emitting diode (LED) display, an organic light emitting diode (OLED) display, thermoelectric tactile display (TTD) or a display of another type.

As described, in some embodiments, the display 12 may be a touchscreen display. The touchscreen display may cause generation of electrical signals in response to receiving a touch input at a touchscreen surface 18. For example, the electrical signals may indicate coordinates of the touch input in terms of X and Y coordinates. The touchscreen display may determine where on the touchscreen surface 18 a player feature made contact.

A player or user of the EGM 10 may contact the display 12 using a player feature. A player feature, as described herein, may be a particular feature of the player such as, for example, a particular body part of the player. For example, the player feature may be a hand, a finger (such as an index finger), legs, feet, torso, arms, etc.

The display 12 may be configured to provide a visual representation of a game being executed on the EGM 10. In some embodiments, a front side of the display will generally be referred to as a touchscreen surface 18 and is the portion of the display 12 upon which displayed features of the game are rendered and displayed and which is generally viewable by the player. In some embodiments, the touchscreen surface 18 may be flat, as shown in FIG. 1. In some embodiments, the touchscreen surface 18 may be curved.

In some embodiments, the display 12 may be coupled to a heating device (not shown in FIG. 1) to selectively radiate heat from the touchscreen surface 18. In some embodiments, the heating device may be integral with the display 12. For example, a thermoelectric tactile display (TTD) is an example of a display 12 with a thermoelectric device integrated thereto for varying temperature detected at the display surface. In some embodiments, the heating device may be a thermoelectric or piezoelectric device for transferring heat from one location to another location.

In some embodiments, when the player feature contacts the touchscreen surface 18, the player feature may detect heat radiating from the touchscreen surface 18. In some embodiments, when the player feature is in close proximity to the display surface or when the player feature is hovering over the display surface, the player feature may detect heat radiating from the touchscreen surface 18.

In some embodiments, the EGM 10 may include a camera 16 which is generally oriented in the direction of a player of the EGM 10. For example, the camera 16 may be directed so that a head of a player of the EGM 10 may be generally visible by the camera while the player is operating the EGM 10. The camera 16 may be a digital camera that has an image sensor that generates an electrical signal based on received light. The electrical signal may represent camera data. The camera data may be stored in memory of the EGM 10 in any suitable image or video file format.

In some embodiments, the camera 16 may be a stereo camera which includes two image sensors (i.e., the camera may include two digital cameras). The image sensors may allow multiple images of a user to be obtained at the same time. In some embodiments, the cameras may generate stereoscopic images. The stereoscopic images may allow depth information to be obtained. Accordingly, the EGM 10 may be configured to determine a location of a user relative to the EGM 10 based on the camera data.

In the EGM 10 shown in FIG. 1, the camera 16 is mounted directly above the display 12 and midway between the left and right ends of the display 12. However, in some embodiments, the camera may be located at other locations.

The EGM 10 may include a video controller that controls the display 12. For example, the video controller may render images of games and provide the rendered images of the games to the display 12.

In some embodiments, the EGM 10 may include a second display 14. The second display 14 may provide additional game data or information to supplement information and images displayed on the display 12. In some embodiments, the second display 14 may provide static information, such as an advertisement for the game, the rules of the game, pay tables, pay lines or other information. In some embodiments, the second display 14 may perform the same functions as the display 12. For example, the second display may be coupled to a heating device to selectively radiate heat from the second display surface. In some embodiments, the second display 14 may display portions of the main game or a bonus game alongside the display 12.

The second display 14 may utilize any of the display technologies described above (e.g., LED, OLED, CRT, etc.). In some embodiments, the second display 14 may be an auto stereoscopic display. In some embodiments, the second display 14 may include a secondary camera (which may be a stereo camera) for tracking the location of a user's eyes relative to the second display 14. In some embodiments, the second display 14 may not be an electronic display, and instead, it may be a display glass for conveying game information.

The EGM 10 may be equipped with one or more input mechanisms. As described, in some embodiments, one or both of the display 12 or the second display 14 may be a touchscreen display. The touchscreen display may include a touchscreen overlay. The touchscreen overlay may be touch-sensitive such that an electrical signal is produced in response to contact with the touchscreen overlay.

In some embodiments, the touchscreen may be a capacitive touchscreen device. The capacitive touchscreen device may include a transparent grid of conductors. When a player touches the capacitive touchscreen device, the touch may cause a capacitive change between at least two conductors, allowing the location of the touch on the touchscreen device to be determined. In some embodiments, the touchscreen device may be configured for multi-touch functionality.

Other input mechanisms may be provided instead of or in addition to the touchscreen. For example, a keypad 36 may accept player input. Player input may include a personal identification number (PIN) or any other player information. A display 38 above the keypad 36 may display a menu for providing instructions and other information. The display 38 may also provide visual feedback to the player relating to keys pressed on the keypad 36. In some embodiments, the keypad 36 may be an input device such as a touchscreen or a dynamic digital button.

The EGM 10 may also be equipped with control buttons 39. The control buttons 39 may be an input mechanism. The control buttons 39 may include buttons for receiving various commonly received inputs associated with a game provided by the EGM 10. In some embodiments, the control buttons 39 may include a bet button, a repeat bet button, a spin reels (or play) button, a maximum bet button, a cash-out button, a display pay lines button, a display payout tables button, select icon buttons or other buttons. In some embodiments, one or more of the control buttons may be virtual buttons provided by a touchscreen.

The EGM 10 may also include currency, credit or token handling mechanisms for receiving currency, credits or tokens required for game play or for dispensing currency, credits or tokens based on the outcome of the game play. A coin slot 22 may accept coins or tokens in one or more denominations to generate credits within EGM 10 for playing games. An input slot 24 may include an optical reader. The input slot 24 may receive machine readable printed tickets. An output slot 26 may include a printer. The output slot 26 may provide machine readable tickets. The input slot 24 and the output slot 26 may be used for cashless gaming.

A coin tray 32 may receive coins or tokens from a hopper upon a win or upon the player cashing out. In some embodiments, the EGM 10 may be a gaming terminal that does not pay in cash, but only issues a printed ticket which is not legal tender. In some embodiments, the printed ticket may be exchanged for legal tender elsewhere.

In some embodiments, a card reader interface 34, such as a card reader slot, may allow the EGM 10 to interact with a stored value card, identification card or a card of another type. A stored value card is a card which stores a balance of credits, currency or tokens associated with that card. An identification card is a card that identifies a user. In some embodiments, the functions of the stored value card and identification card may be provided on a common card. In some other embodiments, the above described functions may not be provided on the same card. For example, in some embodiments, an identification card may be used which allows the EGM 10 to identify an account associated with a user. The identification card uniquely identifies the user and may be used, for example, to track the amount of play associated with the user (e.g., in order to offer the user promotions when their play reaches certain levels). The identification card may be referred to as a player tracking card.

In some embodiments, an identification card may be inserted to allow the EGM 10 to access an account balance associated with the user's account. The account balance may be maintained at a host system or other remote server accessible to the EGM 10. The EGM 10 may adjust the account balance based on game play conducted on the EGM 10.

In some embodiments where a stored value card may be used, a balance may be stored on the card. The account balance may be adjusted to include additional credits when a winning outcome results from game play.

The stored value card and/or identification card may include a memory and a communication interface which allows the EGM 10 to access the memory of the stored value card. The card may take various forms including, for example, a smart card, a magnetic strip card (in which case the memory and the communication interface may both be provided by a magnetic strip), a card with a printed bar code or another type of card conveying machine readable information.

In some embodiments, the card may not be provided in the shape of a conventional card, but in another form factor. For example, the card may be a virtual card residing on a mobile device, such as a smartphone. The mobile device may, for example, be configured to communicate with the EGM 10 via a near field communication (NFC) subsystem.

The nature of the card reader interface 34 may depend on the nature of the cards used with the card reader interface 34. The card reader interface may, for example, be configured to read a magnetic code on the stored value card, interact with PINs associated with the card (e.g., if the card is a smart card), read a bar code or other visible indicia printed on the card (in which case the card reader interface 34 may be an optical reader), or interact with the card wirelessly (e.g., if it is NFC enabled). In some embodiments, the card may be inserted into the card reader interface 34 to trigger reading of the card. In some embodiments, when using NFC enabled cards, reading of the card may be performed without insertion of the card into the card reader interface 34.

While not illustrated in FIG. 1, the EGM 10 may include a chair or seat. In some embodiments, the chair or seat may be fixed to the EGM 10 so that the chair or seat does not move relative to the EGM 10. In some embodiments, the fixed connection may maintain a player in a position that is generally centrally aligned with the display 12.

The embodiments described herein are implemented by physical computer hardware embodiments. The embodiments described herein provide useful physical machines and particularly configured computer hardware arrangements of computer devices, servers, electronic gaming terminals, processors, memory, networks, for example. The embodiments described herein, for example, are directed to computer apparatuses, and methods implemented by computers through the processing of electronic data signals.

The embodiments described herein involve numerous hardware components such as computing devices, cameras, servers, receivers, transmitters, processors, memory, a display, networks and electronic gaming terminals. The components and combinations thereof may be configured to perform the various functions described herein, including providing haptic feedback to a user on a display screen. Accordingly, the embodiments described herein are directed towards electronic machines configured to process and transform electromagnetic signals representing various types of information. The embodiments described herein pervasively and integrally relate to machines and their uses. The embodiments described herein have no meaning or practical applicability outside their use with computer hardware, machines and various hardware components.

Substituting the EGM 10, computing devices, cameras, servers, receivers, transmitters, processors, memory, displays, networks and electronic gaming terminals for non-physical hardware, using mental steps for example, substantially affects the way the embodiments work.

At least some computer hardware features are essential elements of the embodiments described herein, and cannot be omitted or substituted for mental means without having a material effect on the operation and structure of the embodiments described herein. The computer hardware is essential to the embodiments described herein and is not merely used to perform steps expeditiously and in an efficient manner.

Figure 2:
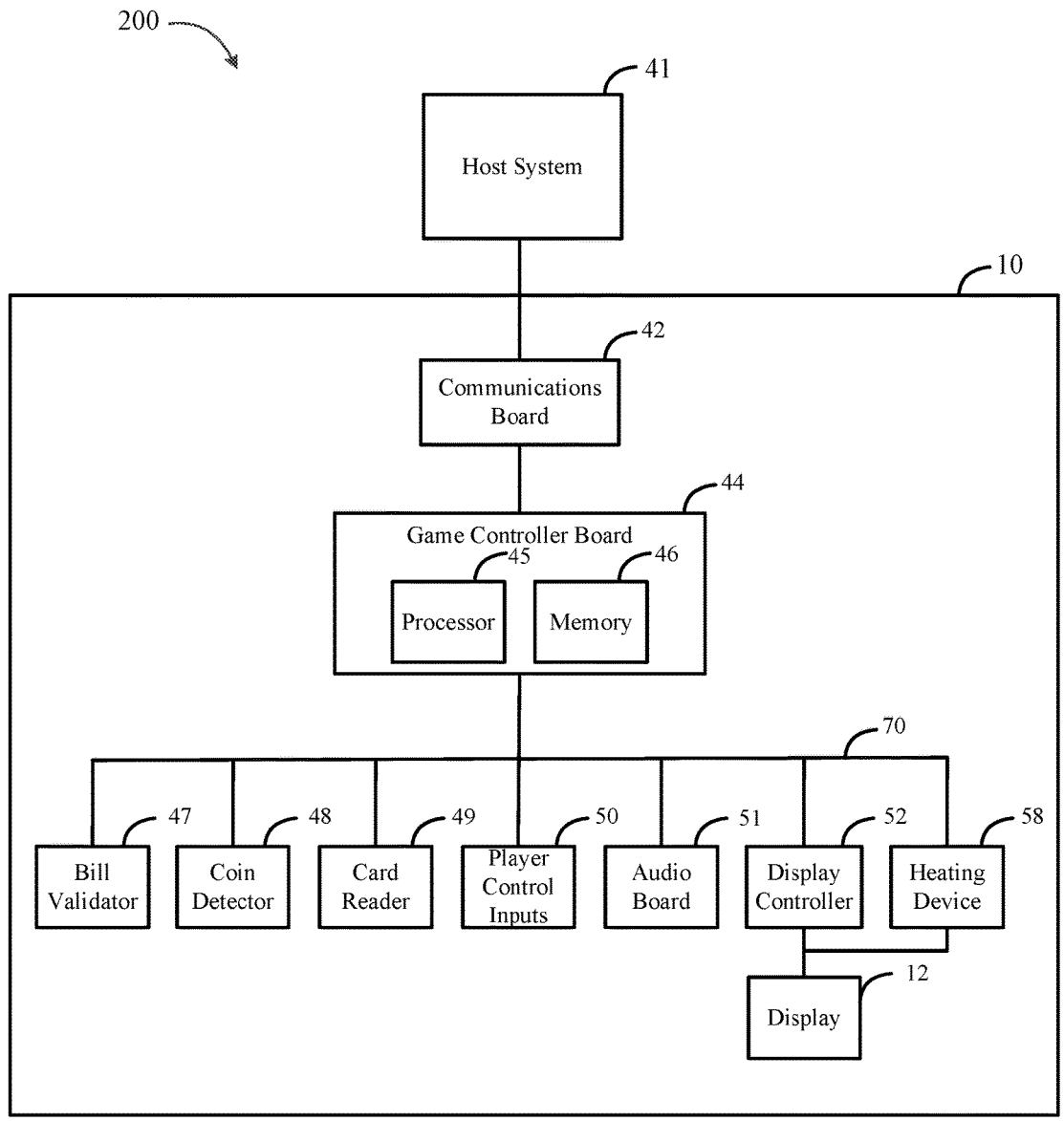
FIG. 2 illustrates a block diagram of an EGM and a host system in accordance with an embodiment of the present disclosure.

Reference is now made to FIG. 2 which illustrates a block diagram 200 of an EGM 10 and a host system 41. The EGM 10 may be of the type described with reference to FIG. 1.

The EGM 10 may be communicably linked to a host system 41. The host system 41 may be a casino host system. The host system 41 may provide the EGM 10 with instructions for carrying out game routines. The host system 41 may also manage a player account and may adjust a balance associated with the player account based on game play at the EGM 10.

The EGM 10 may include a communications board 42. The communications board 42 may contain circuitry for communicably linking the EGM 10 to the host system 41 via a local area network (LAN) or another type of network using any suitable protocol, such as the Game-to-System (G2S) standard protocol. The communications board 42 may allow the EGM 10 to communicate with the host system 41 to enable software to be downloaded from the host system 41, to enable remote configuration of the EGM 10, to enable remote software verification and/or other features. The G2S protocol document is available from the Gaming Standards Association. The G2S protocol document is incorporated herein by reference.

In some embodiments, processors at the host system 41 may execute a game based on input received, via a network, from the EGM (or a computing device) and may provide output of the game execution, via a network, to the EGM (or a computing device). That is, the EGM may be a client device for presenting a game interface. In some embodiments, processors at the EGM (or a computing device) may execute the game. During execution, the EGM may transmit results of the game such that the host system 41 may update player points, credits or dollar accounts.

The communications board 42 may transmit and receive data using a wireless transmitter, or it may be directly connected to a network running throughout the casino floor. The communications board 42 establishes a communication link with a master controller and buffers data between the network and a game controller board 44. The communications board 42 may also communicate with a network server, such as the host system 41, for exchanging information to carry out embodiments described herein.

The communications board 42 may be coupled to a game controller board 44. The game controller board 44 may contain a processor 45 and a memory 46. The processor 45 may carry out programs stored in the memory 46 and for providing the information requested by the host system 41 via the network. In some embodiments, the game controller board 44 may carry out game routines.

In the present disclosure, the term "a processor" is intended to include both a single processor and also a plurality of processors coupled to one another which distribute operations among the processors.

Peripheral devices/boards communicate with the game controller board 44 via a bus 70 using, for example, an RS-232 interface. Such peripherals may include a bill validator 47, a coin detector 48, a card reader interface 49 (e.g., a smart card reader or other type of card reader) and player control inputs 50 (e.g., buttons or a touchscreen). Other peripherals may include one or more cameras 16 (FIG. 1).

In some embodiments, the game controller board 44 may control one or more devices that produce the game output including audio and video output associated with a particular game that is presented to the user. For example, an audio board 51 may convert coded signals into analog signals for driving speakers. A display controller 52, typically requiring high data transfer rates, may convert coded signals to pixel signals for a display 12. As described above with reference to FIG. 1, the display 12 may have a touchscreen surface 18. The display controller 52 and the audio board 51 may be directly connected to parallel ports on the game controller board 44. The electronics on the various boards may be combined onto a single board.

In some embodiments, the EGM 10 may include a heating device 58 for selectively radiating heat from the touchscreen surface 18. In some embodiments, the heating device 58 may be a thermoelectric device or a piezoelectric device for transferring heat from one portion of the touchscreen surface 18 to another portion of the touchscreen surface 18. In some embodiments, the heating device 58 may transfer heat between a portion of the display surface and another component of the display 12 or the EGM 10. For example, the heating device 58 may transfer heat from the touchscreen surface 18 to a heat sink device (not shown in FIG. 2). In another example, the heating device 58 may transfer or generate heat from a heat source device to the touchscreen surface 18 such that heat radiating from the touchscreen surface 18 may be detected by a player feature in contact with or in close proximity to the touchscreen surface 18.

In some embodiments, one or more of peripherals may include or be associated with an application programming interface (API). For example, in some embodiments, an API may be associated with the heating device 58. The API for the heating device 58 may be used to configure the heating device 58 for transferring heat from one location to another location to provide haptic feedback to a player.

In some embodiments, the EGM 10 may include one or more processors provided, for example, in the game controller board 44, the display controller 52 and/or the heating device 58. In some embodiments, a single "main processor", which may be provided in the game controller board 44, for example, may perform all of the processing functions described herein. In some embodiments, two or more processors may be provided to distribute processing functions.

The techniques described herein may also be used with other electronic devices, apart from the EGM 10. For example, in some embodiments, the techniques described herein may be used in a computing device 64.

Figure 3:
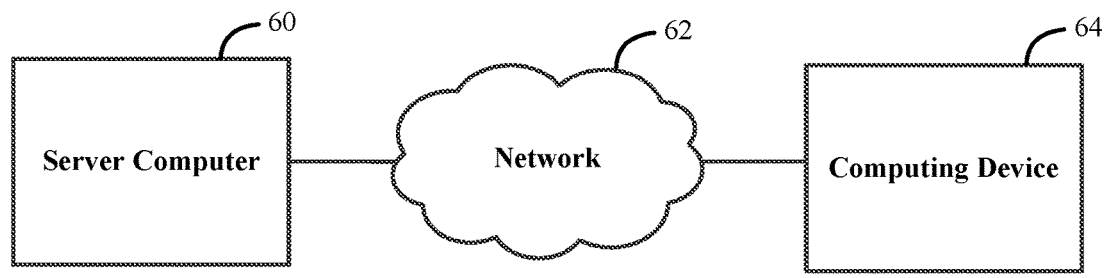
FIG. 3 is an example online implementation of a computer system configured for gaming.

Reference is now made to FIG. 3 which is an example online implementation of a computer system and an online gaming device. For example, a server computer 60 may be configured to enable online gaming in accordance with embodiments described herein. Accordingly, the server computer 60 and/or a computing device 64 may perform one or more functions of the EGM 10 described herein.

One or more users may use a computing device 64 that is configured to connect to the network 62, and via the network 62 to the server computer 60 in order to access the functionality described in this disclosure. The computing device 64 may be configured with hardware and software to interact with an EGM 10 or server computer 60 via the network 62 to implement gaming functionality and provide haptic feedback, as described herein. For simplicity only one computing device 64 is illustrated but the system may include one or more computing devices 64 operable by users to access remote network resources. The computing device 64 may be implemented using one or more processors and one or more data storage devices configured with database(s) or file system(s), or using multiple devices or groups of storage devices distributed over a wide geographic area and connected via a network (which may be referred to as "cloud computing").

The computing device 64 may reside on any networked computing device, such as a personal computer, workstation, server, portable computer, mobile device, personal digital assistant, laptop, tablet, smart phone, wireless application protocol (WAP) phone, an interactive television, video display terminals, gaming consoles, electronic reading device and portable electronic devices or a combination of these.

The computing device 64 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The computing device 30 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The computing device 30 may include one or more input devices, such as a keyboard, mouse, camera, touch screen and a microphone, and may also include one or more output devices such as a display screen (with touchscreen capabilities) and a speaker. In some embodiments, the computing device 64 may have a touchscreen coupled to a heating device. The computing device 30 has a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), signaling system 7 (SS7) signaling network, fixed line, local area network, wide area network, and others, including any combination of these. The computing device 30 is operable to register and authenticate users (using a login, unique identifier, and password for example) prior to providing access to applications, a local network, network resources, other networks and network security devices. The computing device 30 may serve one user or multiple users.

Figure 4:
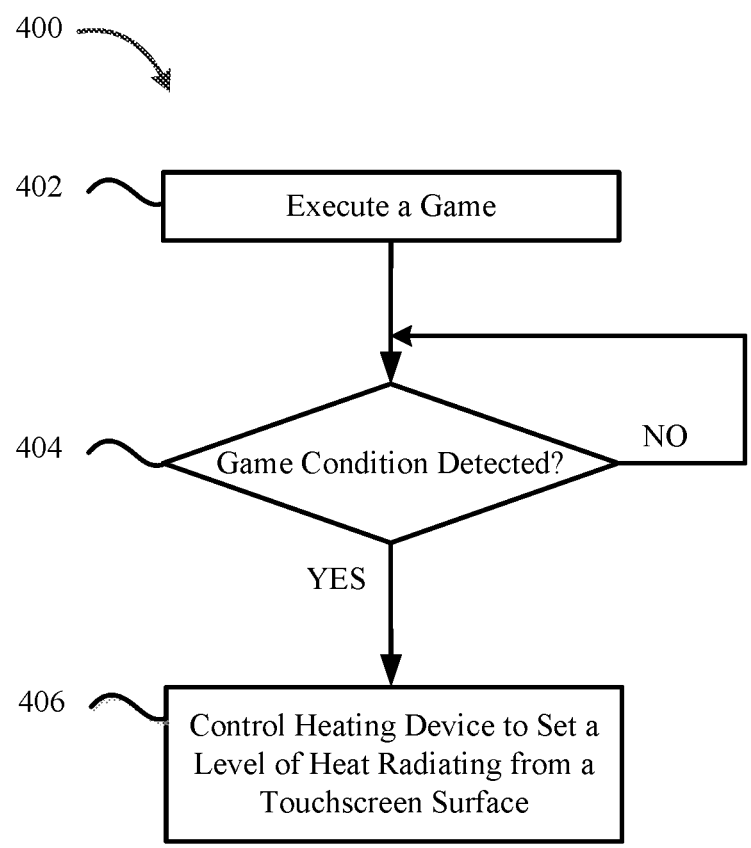
FIG. 4 is a flowchart illustrating an example method of providing haptic feedback on an electronic gaming machine.

Reference is now made to FIG. 4 which illustrates an example method 400 for providing haptic feedback on an electronic gaming machine. The method 400 may be performed by an EGM 10 of the type described above with reference to FIGS. 1 to 2, by a host system 41 or server computer 60 described above with reference to FIGS. 2 to 3 or by a variation or combination of such electronic devices. For example, in at least some embodiments, processor-executable instructions may configure a processor 45 of a game controller board 44 to perform the method 400.

At 402, the processor 45 of the EGM 10 game controller board 44 may execute a game. In some embodiments, the game may require player input. For example, the game may be a slot machine type game and require a player to specify a quantity of points or a quantity of currency that the player would like to bet. The processor 45 may receive player input via a touchscreen surface 18 and/or player control inputs 50.

At 404, the processor 45 may determine whether a pre-determined game condition associated with the game is detected. More particularly, the processor 45 may determine whether a predetermined game condition associated with a temperature effect is detected. In some embodiments, the game condition may be an instruction to display a game animation associated with a temperature effect. For example, when a player has reached a part of the game associated with a storyline, the animated storyline may be provided on the display 12.

In some embodiments, the game condition may include instructions to provide a game status level update. For example, when the processor 45 detects that a player has accumulated a number of points to reach the next game level, the processor 45 may provide instructions to provide haptic feedback indicating that a new game status level has been achieved.

In some embodiments, a game condition may include a set of instructions for guiding a player feature to a target interface element. For example, the processor 45 may execute a set of instructions to provide feedback to a player, in real-time or near real-time, for guiding a player feature towards a desired interface element on the display 12.

If the processor 45 does not detect the game condition, the processor 45 may continue to execute the game and may monitor the game execution to determine whether a game condition is detected.

Example embodiments of detected game conditions will be highlighted with reference to FIGS. 5, 7, 8, 10 and 13.

At 406, in response to detecting the game condition, the processor 45 may control a heating device 58 to set a level of heat radiating from the touchscreen surface 18. In some embodiments, the heating device 58 may be coupled to the touchscreen surface 18 to selectively radiate heat from the touchscreen surface 18. In some embodiments, the heating device 58 may be a thermoelectric or piezoelectric generator for transferring heat from one portion of the touchscreen surface 18 to another portion of the touchscreen surface 18. By transferring heat from one portion of the touchscreen surface 18 to another portion of the touchscreen surface 18, the thermoelectric or piezoelectric generator may cause a difference in detected temperature between one portion of the touchscreen surface 18 and another portion of the touchscreen surface 18. In some embodiments, the heating device may be controlled to either generate heat to be radiated at the touchscreen surface 18 or to not generate heat. That is, when not generating heat, the temperature detected at the touchscreen surface 18 may represent an equilibrium between the touchscreen surface 18 and the surrounding environment.

Example embodiments of controlling the heating device, for example at 406, will be discussed in greater detail with reference to FIGS. 5, 7, 8, 10, 13 and 14.

Displaying a Game Animation

An electronic gaming machine may be located in a casino and alongside a series of other electronic gaming machines with audio and visual display capabilities. While playing games on an electronic gaming machine, a player may be notified of milestones or winnings with music playing on speakers or with animations displayed on the display 12. As the casino environment may be very noisy, in some instances, the music being played through the speakers may not be audible to the player. Further, as an electronic gaming machine may be located alongside several other electronic gaming machine displays, a player may be distracted by visual indicators from other gaming machines. Accordingly, it may be useful to provide additional types of feedback while displaying game animations or other visual indicators on the display 12 of an EGM 10. That is, selectively radiating heat from a touchscreen surface 18 to provide an additional level of feedback to the player may further enhance the player's gaming experience.

Figure 5:
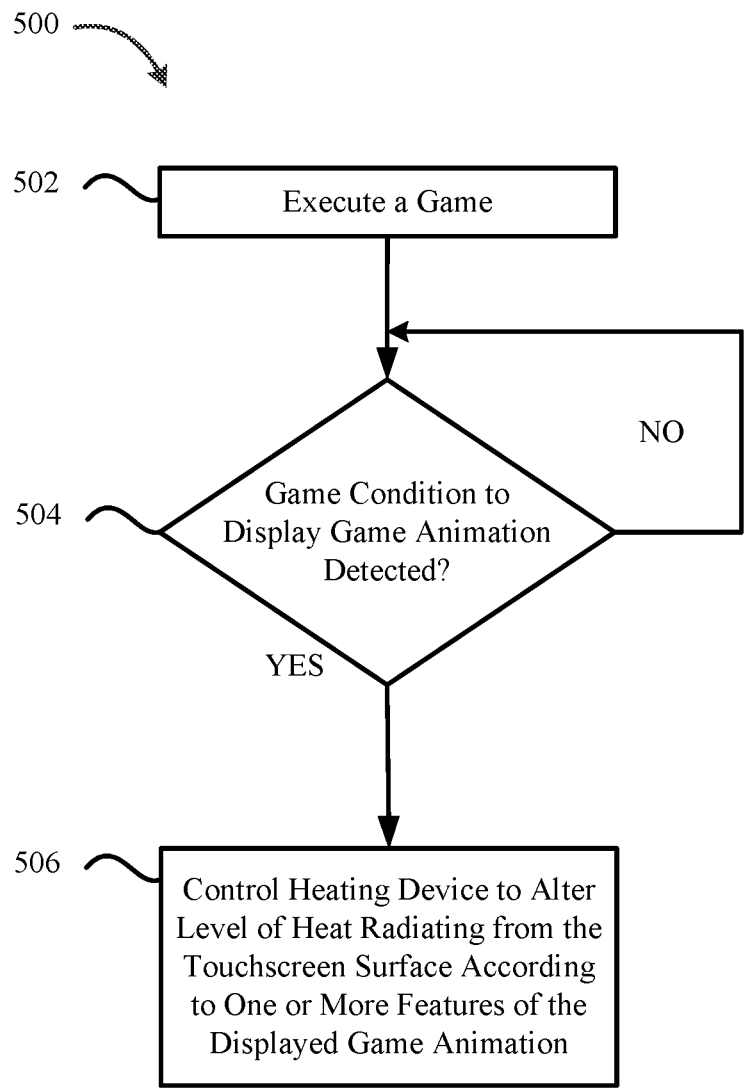
FIG. 5 is a flowchart illustrating an example method for providing haptic feedback while displaying a game animation.

Reference will now be made to FIG. 5 which illustrates an example method 500 for providing haptic feedback while displaying a game animation. The method 500 may be performed by the EGM 10 of the type described above with reference to FIGS. 1 to 2, by a host system 41 or server computer 60 described above with reference to FIGS. 2 to 3 or by a variation or combination of such electronic devices. For example, in at least some embodiments, processor-executable instructions may configure a processor 45 of a game controller board 44 to perform the method 500.

To illustrate the method 500, simultaneous reference will be made to FIGS. 6A and 6B which illustrate an example game interface 600 provided on a display 12 of an EGM 10. The game interface 600 may include a "Total Points" indicator 610 for displaying the total number of accumulated points. The game interface 600 may also include a "Game Level" indicator 612 for displaying the current game level or game stage. In some embodiments, the game interface 600 may include a series of game play interfaces 620, 622, 624. For example, the game play interfaces 620, 622 and 624 may be a series of virtual spinning reals of an electronic slot machine. Further, the game interface 600 may also include a series of input interface elements 630a, 630b, 630c, 630d. For ease of explanation, the series of input interface elements 630a, 630b, 630c, 630d may generally be described as input interface elements 630.

In some embodiments, the display 12 may be a touchscreen display. The touchscreen may have a touchscreen surface 18. The input interface elements 630 may be viewable from the touchscreen surface 18 and a player may contact the touchscreen surface 18 for interacting with the input interface elements 630. For example, using the input interface elements 630, the player may indicate an amount to bet for the game round. As illustrated in FIGS. 6A and 6B, the player may place a bet having a value of 5, 10, 20 or 50 units. The units may, for example, be dollars, points or credits.

Similar to method 400 at 402, at 502, the processor 45 of the EGM 10 game controller board 44 may execute a game. For example, as illustrated in FIGS. 6A and 6B, the game may be an electronic slot machine. The player may provide a bet for the slot machine round and activate the spinning reels. As will be described, in some embodiments, a player feature may contact an input interface element and the processor 45 may control the heating device 58 to provide haptic feedback. Further, the player may activate a selected input interface element by using an additional action. For example, to activate the selected input interface element, the player may provide an additional finger gesture, such as double or triple tapping the selected input interface element. In another example, the player may activate the selected input interface element by depressing another control button, for example, control buttons 39 of the EGM 10.

At 504, the processor 45 may determine whether a game condition to display a game animation is detected. More particularly, the processor 45 may determine whether a game condition to display a game animation associated with a temperature effect is detected. For example, there may be a variety of scenarios requiring a game animation to be provided on a display 12. In some embodiments, when a player has reached a game level associated with a storyline, the processor 45 may display a game animation relating to the storyline. The game animation may be associated with a temperature effect. In some embodiments, when the player wins a large prize or passes a monumental game round, the processor 45 may display a game animation for providing feedback to the player. In some embodiments, the game animation may include moving objects or motion video clips. Although two examples of game conditions to display a game animation are described, the processor 45 may display a game animation based on any other impetus from executing the game. In the example embodiments, the game animations may be associated with a temperature effect.

If the processor 45 does not detect a game condition to display a game animation that is associated with a temperature effect, the processor 45 may continue to execute the game and monitor the execution to determine whether a game condition to display a game animation is detected.

If the processor 45 detects a game condition to display a game animation associated with a temperature effect, at 506, the processor 45 may control the heating device 58 to set or alter the level of heat radiating from the touchscreen surface 18 according to one or more features of the displayed game animation.

For example, if the game animation includes an animated explosion, while the animated explosion is occurring, the processor 45 may control the heating device 58 to increase the level of heat radiating from the touchscreen surface 18. Accordingly, the player may feel a level of heat associated with the animated explosion.

In another example, when a player wins a bonus round, at 504, the processor may detect that a game condition to display an animated notification associated with a temperature effect to the player may be required. As illustrated in FIG. 6B, if the player wins a bonus round, a shape 6, such as a star, may intermittently flash on the game interface 600. At 506, the processor 45 may detect the game condition to provide the shape 650 and may control the heating device 58 to pulse the level of heat radiating from the touchscreen surface 18. That is, when the shape 650 is displayed, the processor 45 may increase the level of heat radiating from the touchscreen surface 18 and when the shape 650 is not displayed, the processor 45 may decrease the level of heat radiating from the touchscreen surface 18. Accordingly, upon winning a bonus round, the player may feel pulses of heat radiating from the touchscreen surface 18. In some embodiments, the player may feel another suitable temperature effect. For example, the temperature effect may include cycles of gradually increasing temperature followed by gradually decreasing temperature.

In some embodiments, when the shape 650 is not displayed on the touchscreen surface 18, the processor 45 may control the heating device 58 to not radiate heat from the touchscreen surface 18. That is, when the shape 650 is not displayed on the touchscreen surface 18, the heating device 58 may simply not be activated and, over time, the temperature at the touchscreen surface 18 may decrease to reach an equilibrium temperature with the surrounding environment. In some embodiments, when the shape 650 is not displayed on the touchscreen surface 18, the processor 45 may control the heating device 58 to actively transfer heat away from the touchscreen surface 18. Actively transferring heat away from the touchscreen surface 18 may cause a cool sensation to be felt.

In some embodiments, if the processor 45 detects a game condition, such as a game win condition, the processor 45 may control the heating device 58 to set or alter the level of heat radiating from the touchscreen surface 18. That is, the processor 45 may control the heating device 58 to set or alter levels of heat prior to or irrespective of whether a game animation or other visual effect is displayed on the display 12.

Figure 6B:
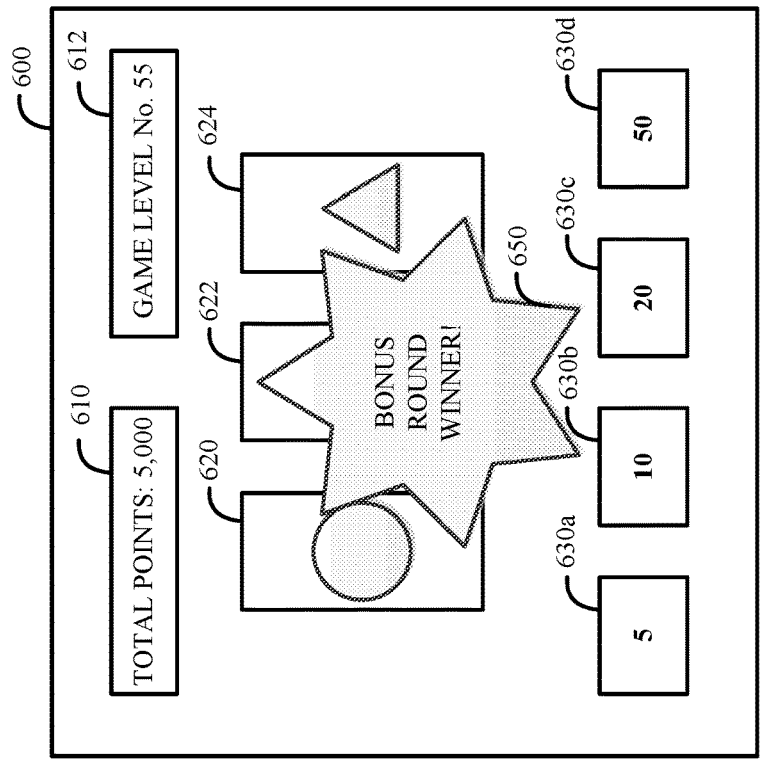
FIGS. 6A and 6B illustrate an example game interface provided to a player of an EGM.
Figure 6A:
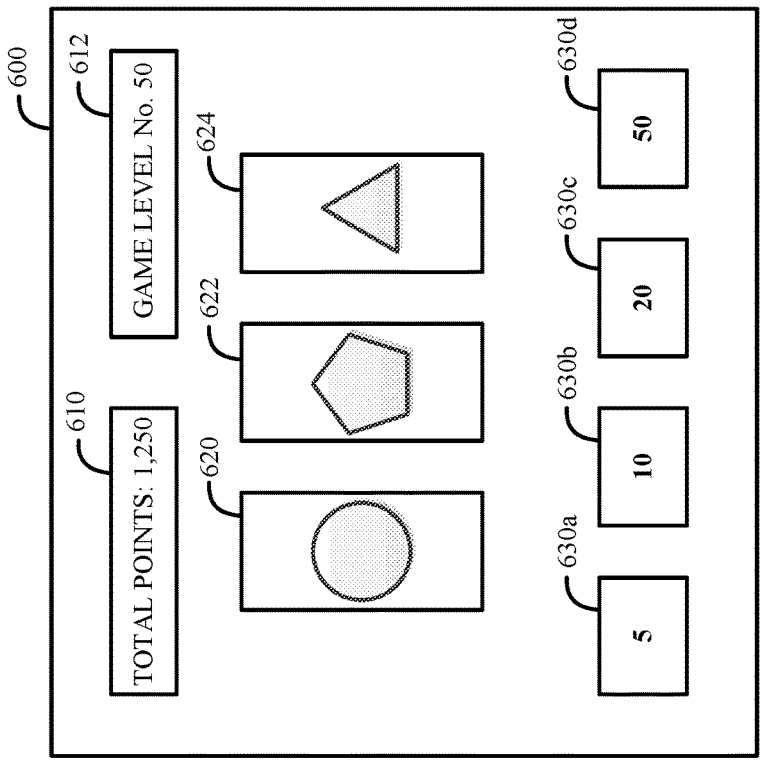

Accordingly, as illustrated in FIGS. 6A and 6B, in addition to providing visual (e.g. flashing shape 650) and audible (e.g. music through speakers) feedback to the player, the processor 45 may control the heating device 58 to cause pulses of heat, or other temperature effects, to radiate from the touchscreen surface 18 and provide additional sensory feedback to the player.

Providing a Game Status Level Update

While at a casino or gaming establishment, a player may be engaged with an EGM 10 for long periods of time. A player may adapt to audio and visual indicators provided by the EGM 10. Accordingly, it may be desirable to provide the player with additional sources of progressive feedback or additional types of indicators for conveying information relating to games. For example, it may be desirable to provide indications relating to the progressive nature of the game being played. Alternatively, it may be desirable to provide indications relating to potential risks and potential rewards associated with the games. It may also be desirable to provide the player with indications of progressive merit, such as advancement of game levels or accumulation of points or credits.

Figure 7:
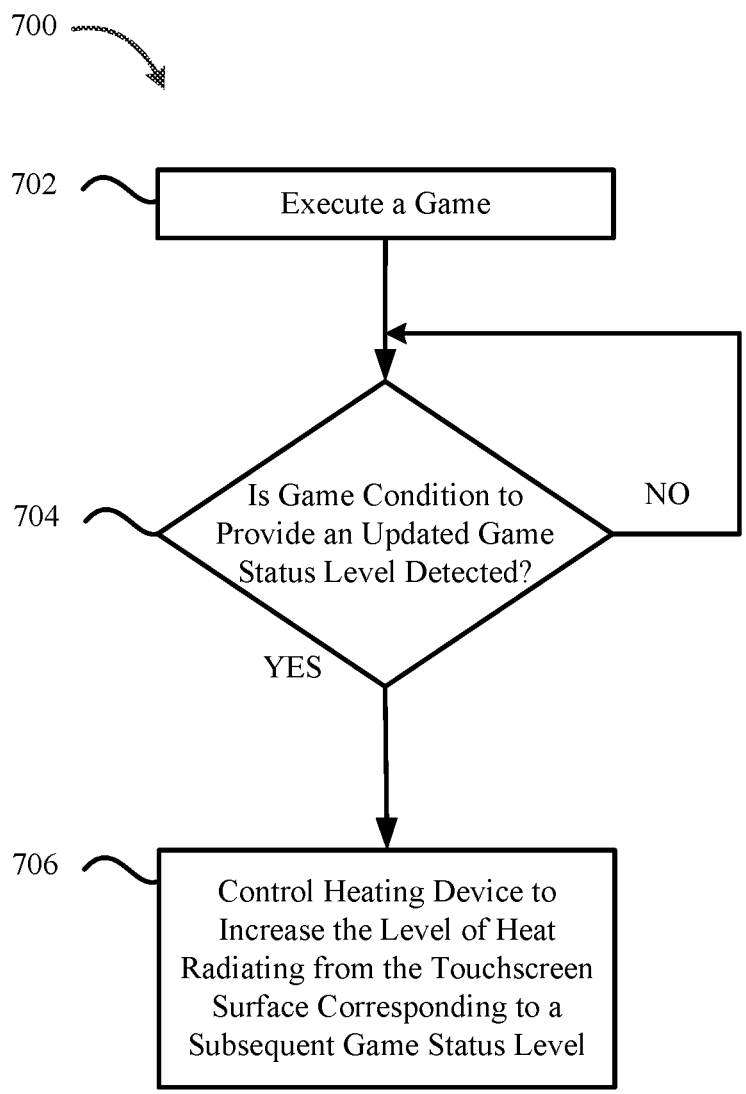
FIG. 7 is a flowchart illustrating an example method for providing haptic feedback while providing a game status level update.

Reference will now be made to FIG. 7 which illustrates an example method 700 for providing haptic feedback while providing a game status level update. The method 700 may be performed by the EGM 10 of the type described above with reference to FIGS. 1 to 2, by a host system 41 or server computer 60 described above with reference to FIGS. 2 to 3 or by a variation or combination of such electronic devices. For example, in at least some embodiments, processor-executable instructions may configure a processor 45 of a game controller board 44 to perform the method 700.

Similar to the method 400 at 402, at 702, the processor 45 of the EGM 10 game controller board 44 may execute a game. As will be described with examples, the processor 45 may execute a game with a progressive or time limiting nature.

At 704, the processor 45 may determine whether a game condition to provide a game status level update is detected. If the processor 45 determines that a game status level update is not required, the processor 45 continues to monitor the game execution to determine whether a game condition to provide a game status level update is detected.

If the processor 45 determines that a game status level update is required, at 706, the processor 45 may control the heating device 58 to alter or adjust the level of heat radiating from the touchscreen surface 18. In some embodiments, when a game status level update is required, at 706, the processor 45 may control the heating device 58 to increase the level of heat radiating from the touchscreen surface 18. In some other embodiments, when a game status level update is required, at 706, the processor 45 may control the heating device 58 to decrease the level of heat radiating from the touch screen surface 18. For example, the game status level update may provide a progressively colder temperature effect.

In some embodiments, at 702, the processor 45 may execute a game having progressive game levels. The game may have several game levels and a player may advance to a next game level by accumulating a pre-determined number of points. For example, the game may require the player to accumulate 1,000 credits to advance to a new game level. Accordingly, at 704, the processor 45 may determine a points tally to determine whether the player has collected a pre-determined number of points to advance to a subsequent game level. That is, the processor 45 may determine whether the current points tally indicates that at least 1,000 game points have been accumulated since the prior game status level update. Further, in some embodiments, the processor 45 may determine a current heat level associated with a current game status level.

In response to determining that the player has collected the pre-determined number of points to advance to the subsequent game level, at 706, the processor 45 may control the heating device 58 to increase the level of heat radiating from the touchscreen surface 18. The increased level of heat may correspond to the subsequent game level. Each game level may be associated with a level of heat to be radiated from the touchscreen surface 18. When the processor 45 determines that the player has collected the predetermined number of points for the associated game level (e.g. 1,000 accumulated points since the prior game level), the processor 45 may control the heating device 58 to increase the level of heat or to set the level of heat associated with the associated game level. As the player advances to subsequent game levels, the increasing level of heat may indicate increasing levels of game intensity and therefore provide the user with an enhanced gaming experience.

In some embodiments, at 702, the processor 45 may execute a time-limited game. The game may require that a player complete a game level within a specified amount of time. For example, the game may include 5 game levels and may require the player to complete all 5 game levels within 15 minutes. Each minute of game play that elapses may be associated with a defined level of heat radiating from the touchscreen surface 18. Accordingly, in this example, at 702, the processor 45 may execute the time-limited game and initiate a game timer.

After a pre-determined amount of time has elapsed, for example after each minute has elapsed, at 704, the processor 45 may determine that a game condition to provide a game status level update is detected. That is, after an elapsed minute, the processor 704 may determine that a game status level update is required. Subsequently, at 706, the processor 45 may control the heating device 58 to increase the level of heat or to set the level of heat associated with the amount of elapsed game time. Accordingly, as the player advances to later stages of the game after progressively increased amount of elapsed time, the increasing level of heat may indicate that time may be running out and therefore provide the user with an additional source of gaming feedback.

In some embodiments, the EGM 10 may track player behaviour in order to ensure the player is playing responsibly. For example, at 704, the processor 45 may determine whether one or more irresponsible gaming conditions are found to exist. For example, an irresponsible gaming condition may be determined based on historical data regarding the player's game play. For example, the processor 45 may determine whether a player's losses during a game session exceed a threshold and, if so, the processor 45 may determine that an irresponsible gaming condition exists and may determine that a game status level updated may be required. When one or more irresponsible gaming conditions are found to exist, the processor 45 may control the heating device to increase the level of heat radiating from the touchscreen surface so as to be discouraging or annoying to the player. For example, in the discouraging mode, the heating device may increase the level of heat such that the touchscreen surface 18 may be too uncomfortable to touch.

Accordingly, in addition to providing the player with game status level updates, such as via the "Game Level" indicator 612, the processor 45 may be configured to provide the player with game status level updates by radiating progressively greater levels of heat from the touchscreen surface 18.

Guiding a Player Feature to a Touchscreen Target Interface Element

An EGM 10 may execute a game requiring a player to locate a target interface element. The EGM 10 may provide audio and visual feedback for assisting the player in locating the target interface element. However, as described above, an electronic gaming machine may be located in a casino and located alongside several other gaming machines. The casino environment may be very noisy and audio feedback played through speakers may not be audible to the player. Further, the player may be distracted by visual indicators from other gaming machines. Accordingly, it may be useful to provide an additional level of feedback to the player for enhancing the player's gaming experience.

Figure 8:
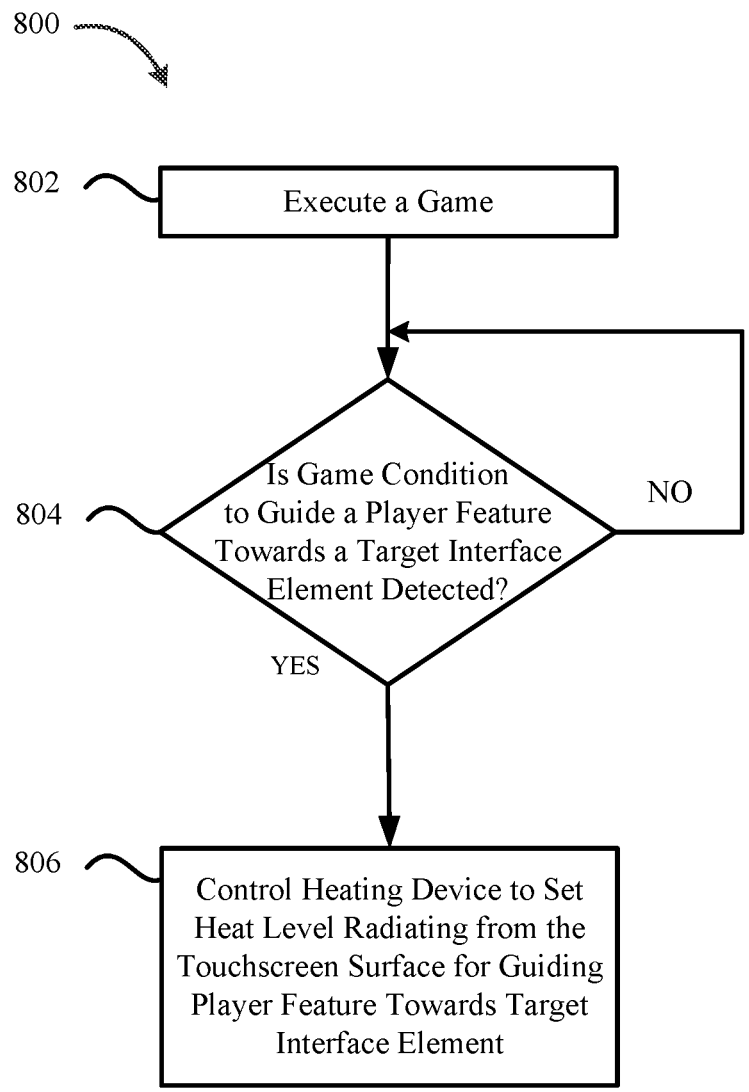
FIG. 8 is a flowchart illustrating an example method for providing haptic feedback to guide a player feature towards a target interface element.

Reference will now be made to FIG. 8 which illustrates an example method 800 for providing haptic feedback to guide a player feature towards a target interface element. The method 800 may be performed by the EGM 10 of the type described above with reference to FIGS. 1 to 2, by a host system 41 or server computer 60 described above with reference to FIGS. 2 to 3 or by a variation or combination of such electronic devices. For example, in at least some embodiments, processor-executable instructions may configure a processor 45 of a game controller board 44 to perform the method 800.

To describe the method 800, simultaneous reference will be made to FIGS. 9A, 9B and 9C which illustrate an example game interface 900 provided on a display 12. In some embodiments, the game interface 900 may be provided on a touchscreen display having a touchscreen surface 18. The game interface 900 may include a target interface element 902 and several game objects 904 distinct from the target interface element 902. Although one target interface element 902 and three game objects 904 are illustrated, any number of target interface elements 902 and any number of game objects 904 may be provided on the game interface 900. Further, although the target interface element 902 is generally illustrated as a rectangular object, the target interface element 902 may be any shape. Similarly, although the game objects 904 are generally illustrated as circular objects, the game objects 904 may be any shape and may be the same shape as the target interface element 902. The game interface 900 may include other objects, including other graphics or text. However, for ease of explanation, selected objects are illustrated in the game interface 900.

In some embodiments, the game may require that a player contact a touchscreen surface 18 to identify a target interface element 902. The player may interact with the game interface 900 using a player feature, such as an outstretched finger at a first location 910 (FIG. 9A), second location 912a (FIG. 9B), or third location 912b (FIG. 9C).

In some embodiments, the target interface element 902 may be a "Call Attendant" button. For example, the method 800 may assist a player with visual impairment in locating the target interface element 902, such as the "Call Attendant". That is, as will become apparent, by receiving haptic feedback based on a level of heat radiating from the touchscreen surface 18, a player with visual impairment may be guided to the "Call Attendant" button.

In some embodiments, the target interface element 902 may be a game object, such as a bonus prize. For example, the game may require that the player locate a target interface element 902 in a game interface 900 filled with other objects, where the other objects may be nominal prize elements. In some embodiments, the target interface element 902 may be hidden. That is, the target interface element 902 may be camouflaged and not easily distinguished from other game objects 904. For example, the target interface element 902 may be a circular object and difficult to distinguish from the other game objects 904. Accordingly, the game may require that the player locate the target interface element 902 by contacting the touchscreen surface 18 using an outstretched finger at a first location 910, second location 912a, or third location 912b.

In some embodiments, the target interface element 902 may not be displayed or may not be visible on the touchscreen surface 18. That is, the processor 45 may not render or make visible to the player the target interface element 902. For example, the game may require that the player use the provided haptic feedback to locate the target interface element 902.

Referring again to FIG. 8, similar to method 400 at 402, at 802, the processor 45 of the EGM 10 game controller board 44 may execute a game. While executing the game, the processor 45 may provide the target interface element 902. In some embodiments, the target interface element 902 may be provided and visible on the touchscreen surface 18. In some other embodiments, the target interface element 902 may not be displayed or visible on the touchscreen surface 18. That is, the target interface element 902 may be defined but may not be rendered and displayed on the touchscreen surface 18.

At 804, the processor 45 may detect a game condition. The game condition may include an instruction to guide a player feature towards a target interface element 902. For example, the processor 45 may execute the game and reach a game level that requires the player to locate the target interface element 902. If the processor 45 does not detect a game condition to guide a player feature towards a target interface element 902, the processor 45 may continue to execute the game and monitor the execution to determine whether a game condition to guide the player feature towards the target interface element 902 is detected.

If the processor 45 detects a game condition to guide a player feature towards the target interface element 902, at 806, the processor 45 may control the heating device 58.

Figure 10:
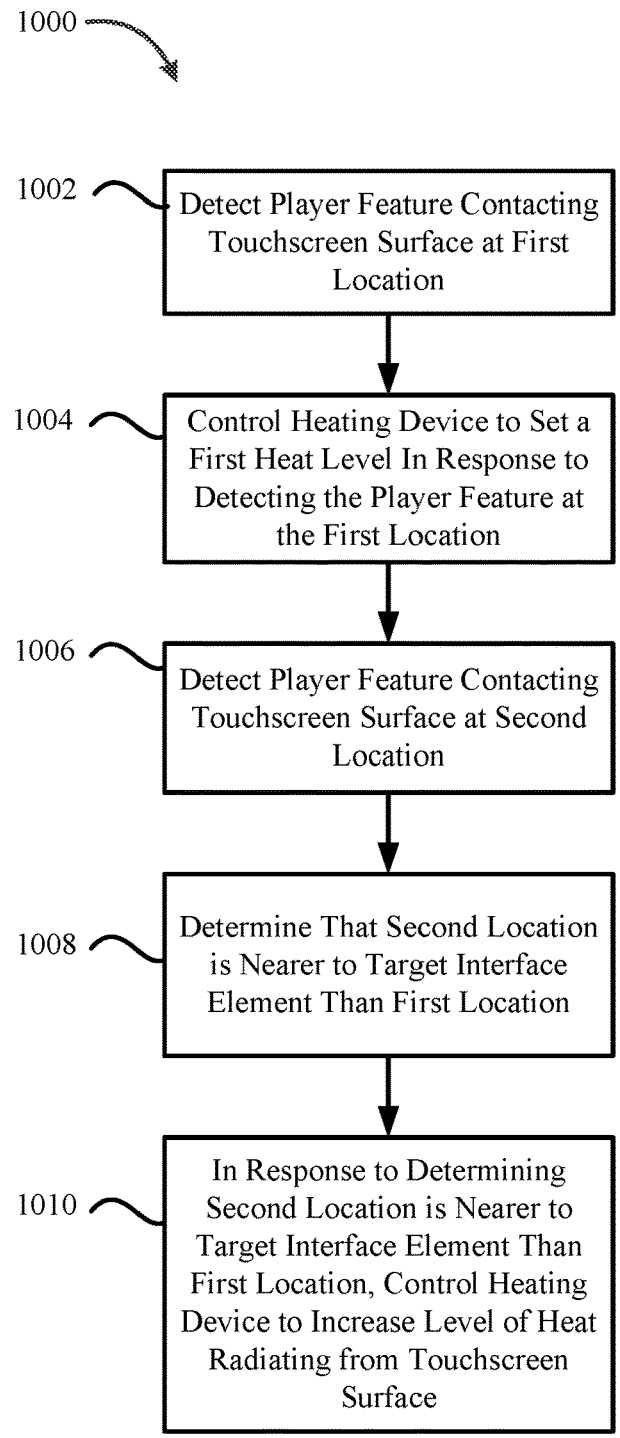
FIG. 10 is a flowchart illustrating an example method for controlling a heating device for guiding a player feature towards a target interface element.

Reference will now be made to FIG. 10 which illustrates an example method 1000 for controlling a heating device for guiding a player feature towards a target interface element 902. The method 1000 may be performed at 806 in FIG. 8. The method 1000 may be performed by the EGM 10 of the type described above with reference to FIGS. 1 to 2, by a host system 41 or server computer 60 described above with reference to FIGS. 2 to 3 or by a variation or combination of such electronic devices. For example, in at least some embodiments, processor executable instructions may configure a processor 45 of a game controller board 44 to perform the method 1000.

At 1002, the processor 45 may detect a player feature contacting the touchscreen surface 18 at a first location 910. For example, referring again to FIG. 9A, the processor 45 may detect an outstretched player finger at the first location 910. Although the player feature is described as an outstretched player finger, the player feature may be any other feature of the player, including, for example the bottom of a player's palm. In some embodiments, the player feature may be pen device that is held by the player and designed for contacting and interfacing with the touchscreen surface 18.

At 1004, the processor 45 may control the heating device 58 to set a first heat level in response to detecting the player feature at the first location 910. For example, the processor 45 may control the heating device 58 such that the detected heat radiating from the touchscreen surface 18 may be equivalent to 70 degrees Fahrenheit. Although the level of heat is being described with respect to a temperature measurement in degrees Fahrenheit, any other measurement of heat radiating from the touchscreen surface 18 may be used to describe the heat felt by the player's feature. Further, although the detected heat radiating from the touchscreen surface 18 is described as being equivalent to 70 degrees Fahrenheit when the player feature is detected at the first location 910, the processor 45 may configure the level of heat radiating from the touchscreen surface 18 to be any other level.

At 1006, the processor 45 may detect the player feature contacting the touchscreen surface at a second location 912a. For example, referring to FIG. 9B, the processor 45 may detect the outstretched player finger at the second location 912a.

At 1008, the processor 45 may determine whether the second location is nearer to the target interface element than the first location. For example, referring again to FIG. 9B, the processor 45 may detect that the outstretched player finger at the second location 912*a* is nearer to the target interface element 902 than the outstretched player finger at the first location 910. In some embodiments, the processor 45 may determine whether the second location 912*a* is nearer to the target interface element 902 than the first location 910 by calculating and comparing absolute distances. That is, the processor 45 may determine a first absolute distance between the first location 910 and the target interface element 902, determine a second absolute distance between the second location 912*a* and the target interface element 902 and compare the absolute distances to determine whether the second absolute distance is less than the first absolute distance.

Alternatively, in some embodiments, the processor 45 may determine whether the second location 912*a* is nearer to the target interface element 902 than the first location 910 using relative measurements. For example, the processor 45 may determine, using a coordinate system, where the target interface element 902 and the first location 910 are located with respect to a reference axis in a coordinate system. Subsequently, the processor 45 may determine a magnitude and direction associated with a vector representing a path from the first location 910 to the second location 912*a*. The processor 45 may determine, using the determined magnitude and direction, whether the second location 912*a* is nearer to the target interface element 902 than the first location 910.

At 1010, in response to determining that the second location 912*a* is nearer to the target interface element than the first location 910, the processor 45 may control the heating device to increase the level of heat radiating from the touchscreen surface 18. Continuing with the example described above, in response to detecting the player feature at the first location 910, the processor 45 was controlling the heating device 58 to set a first heat level, such as detected heat equivalent to 70 degrees Fahrenheit. At 1010, the processor 45 may subsequently control the heating device to increase the level of heat radiating from the touchscreen surface 18 such that the heat radiating from the touchscreen surface 18 may be felt by the player's feature to be equivalent to 80 degrees Fahrenheit. Accordingly, as the player feature contacts the touchscreen surface 18 at a location nearer to the target interface element 902 than the previous location, the player feature may feel increasing heat radiating from the touchscreen surface 18. The increasing heat radiating from the touchscreen surface 18 may indicate to the player that the player feature is getting nearer to the target interface element 902.

Accordingly, as in the example illustrated with reference to FIGS. 9A and 9B, as the player feature contacts the touchscreen surface 18 at successively different locations, if the processor 45 increases the level of heat radiating from the touchscreen surface 18, the processor 45 may progressively provide signals to the player that the player feature is progressively moving towards the target interface element 902.

Figure 9A:
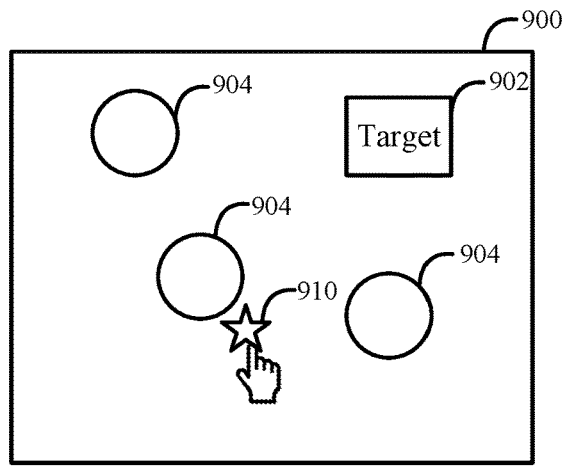
FIGS. 9A, 9B, 9C illustrate an example game interface when providing haptic feedback to guide a player feature towards a target interface element.
Figure 9B:
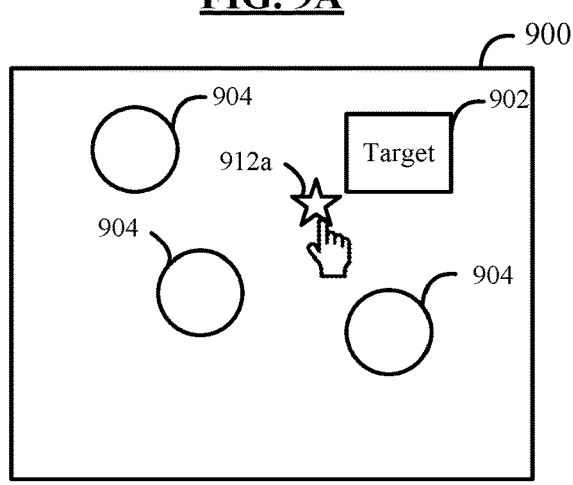
Figure 9C:
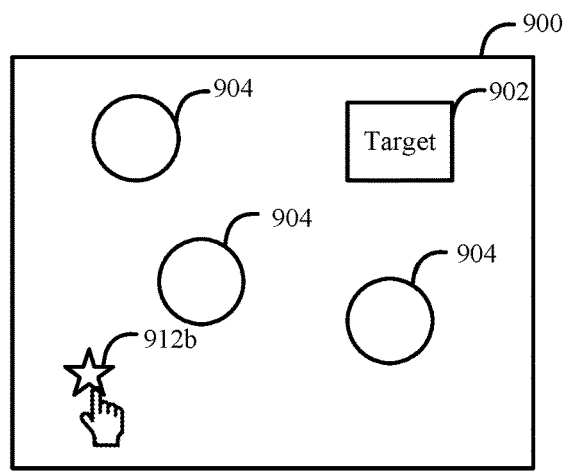

In another example, referring concurrently to FIGS. 9A and 9C, the processor 45 may detect that the outstretched player finger may be moving away from the target interface element 902. Referring to FIG. 9C, at 1006, the processor 45 may detect the player feature contacting the touchscreen surface at a third location 912*b*.

At 1008, the processor 45 may determine whether the third location 912*b* (in FIG. 9C) is nearer to the target interface element 902 than the first location 910 (in FIG. 9A). For example, referring to FIG. 9C, the processor 45 may detect that the outstretched player finger at the third location 912*b* (in FIG. 9C) is not nearer to the target interface element than the first location 910 (in FIG. 9A). That is, the outstretched player finger at the third location 912*b* (in FIG. 9C) may be further away from the target interface element 902 than the outstretched player finger at the first location 910. Accordingly, at 1008, the processor 45 determines that the third location 912*b* is not nearer to the target interface element 902 than the first location 910 and the processor 45 may not execute the operation at 1010 of the method 1000.

In some embodiments, when the processor 45 determines that the third location 912*b* is not nearer to the target interface element 902 than the first location 910, the processor 45 may control the heating device to cease setting the first heat level. For example, when the processor 45 determines that the third location 912*b* is not nearer to the target interface element 902, the processor 45 may no longer maintain the heat radiating from the touchscreen surface 18 to be equivalent to 70 degrees Fahrenheit. That is, by ceasing operations to control the heating device 58, the touchscreen surface 18 may obtain an equilibrium temperature with the surrounding environment. After a period of time, the temperature felt by the player feature at the touchscreen surface 18 may be less than 60 degrees Fahrenheit.

In some embodiments, the heating device 58 may be a thermoelectric or piezoelectric device capable of transferring heat from a source location of the touchscreen surface 18 to a sink location of the touchscreen surface 18. Thus, the processor 45 may control the heating device 58 to remove heat from the touchscreen surface 18. For example, when the processor 45 determines that the third location 912*b* is not nearer to the target interface element 902 than the first location 910, the processor 45 may control the heating device 58 (e.g., in the present example, the heating device 58 may be a thermoelectric or piezoelectric device) to transfer heat from the touchscreen surface 18 to a heat sink location located away from the display 12. Overall, when the processor 45 determines that the third location 912*b* is not nearer to the target interface element 902 than the first location 910, the processor 45 may not execute the operation at 1010 of the method 1000, but may actively transfer heat away from the touchscreen surface 18.

Accordingly, in addition to providing audio and visual prompts to guide a player, the processor 45 may guide a player using haptic feedback. By increasing or decreasing the level of heat radiating from the touchscreen surface 18 and/or detected by the player feature, the processor 45 may guide a player feature towards a target interface element 902. Increasing the level of heat radiating from the touchscreen surface 18 may indicate to the player that the player feature may be moving nearer to the target interface element 902. Conversely, decreasing the level of heat radiating from the touchscreen surface 18 may indicate to the player that the player feature may be moving away from the target interface element 902.

Game-Value Interface Elements

As described above, an EGM 10 may incorporate a touchscreen display. The touchscreen display may provide a visual display to the player and may also provide an input mechanism allowing a player to provide instructions to the EGM 10. In some embodiments, the touchscreen display may be a capacitive touchscreen display and a processor may determine a location where a player may have contacted the touchscreen display. In some embodiments, a player may provide input to the EGM 10 based on information visually displayed on the touchscreen. Accordingly, it may be useful to provide additional feedback or indicators to a player relating to input choices available to the player.

Figure 11:
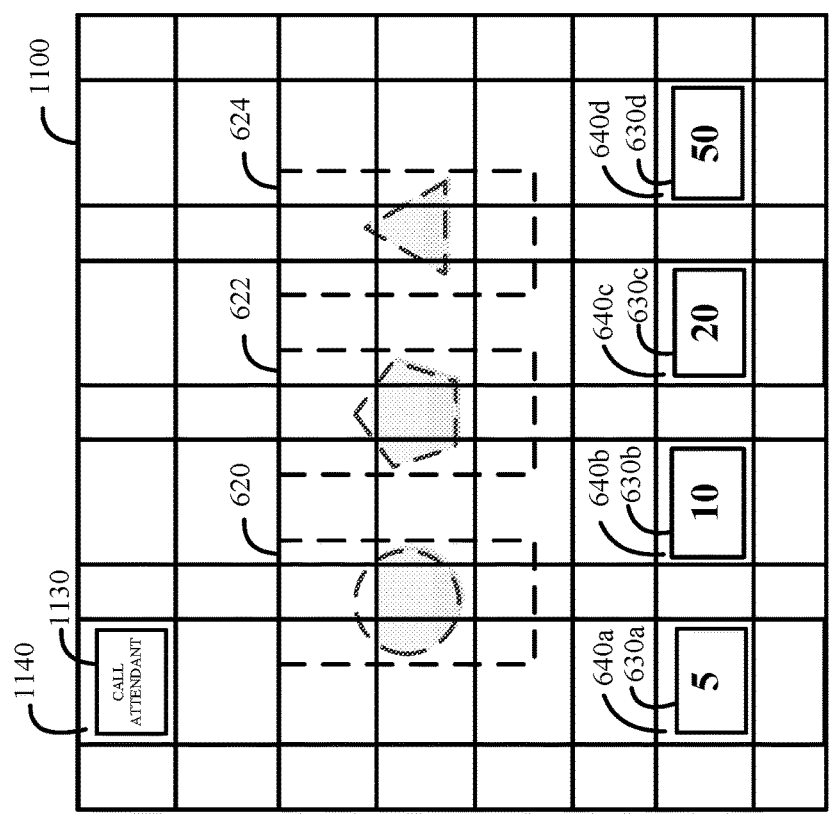
FIG. 11 illustrates an example game interface provided to a player of an EGM.

Reference will now be made to FIG. 11 which illustrates an example game interface 1100 provided on a display 12 of an EGM 10. The display 12 may be a touchscreen display. The EGM 10 may be of the type described above with reference to FIGS. 1 to 2 or a variation of such an electronic display. The processor 45 may provide the game interface 1100 to the display 12 and a player may view the game interface 1100 on the touchscreen surface 18.

The game interface 1100 may be similar to the game interface 600 shown in FIGS. 6A and 6B. However, for ease of explanation and illustration, certain portions of the game interface 1100 may not be illustrated. For example, the "Total Points" indicator 610 and the "Game Level" indicator 612 have not been illustrated in the game interface 1100 so that other aspects of the game interface 1100 may be more apparent. Further, the series of game play interfaces 620, 622, 624 are drawn with hatched lines so that other aspects of the game interface 110 may be more apparent.

The game interface 1100 may include a series of input interface elements 630a, 630b, 630c, 630d. The player may use the series of input interface elements 630 to provide instructions to the EGM 10. Further, the game interface 1100 may include additional interface elements, such as a "Call Attendant" interface element 1130. For example, the player may select the "Call Attendant" interface element 1130 when the player requires assistance from casino staff. In some embodiments, further to the illustrated input interface elements 630 and the "Call Attendant" interface element 1130, the game interface 1100 may include any number of additional input interface elements.

Each of the input interface elements, such as input interface elements 630a, 630b, 630c, 630d, 1130, may be associated with a touchscreen surface portion. For example, as illustrated in FIG. 11, a first input interface element 630a is associated with a first touchscreen surface portion 640a, a second input interface element 630b is associated with a second touchscreen surface portion 640b, a third input interface element 630c is associated with a third touchscreen surface portion 640c, and a fourth input interface element 640d is associated with a fourth touchscreen surface portion 640d. Further, the "Call Attendant" interface element 1130 may be associated with a fifth touchscreen surface portion 1140. Although five touchscreen surface portions are identified in FIG. 11, the processor 45 may provide any number of touchscreen surface portions. The touchscreen surface portions may be of any shape.

Figure 12:
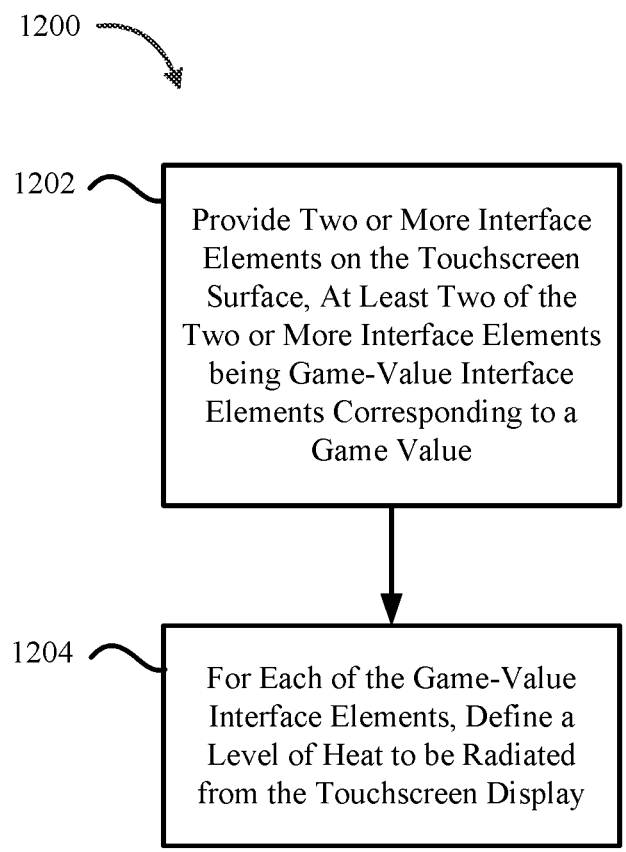
FIG. 12 is a flowchart illustrating an example method for defining a level of heat for game-value interface elements.

Reference will now be made to FIG. 12 which illustrates an example method 1200 of defining a level of heat for game-value interface elements. The method 1200 may be performed by the EGM 10 of the type described above with reference to FIGS. 1 to 2, by a host system 41 or server computer 60 described above with reference to FIGS. 2 to 3 or by a variation or combination of such electronic devices. For example, in at least some embodiments, processor-executable instructions may configure a processor 45 of a game controller board 44 to perform the method 1200. To describe method 1200, simultaneous reference will be made to FIG. 11.

At 1202, the processor 45 may provide two or more interface elements for the display 12. For example, the processor 45 may provide the series of input interface elements 630a, 630b, 630c, 630d and the "Call Attendant" interface element 1130 for display on the display 12.

In some embodiments, at least two of the two or more interface elements may be game-value interface elements. Each game-value interface element may be associated with a game value. For example, the input interface elements 630a, 630b, 630c, 630d may be game-value interface elements. The first input interface element 630a may be associated with a game-value of 5 points, credits or dollars. The second input interface element 630b may be associated with a game-value of 10 points, credits or dollars. The third input interface element 630c may be associated with a game-value of 20 points, credits or dollars. Further, fourth input interface element 630d may be associated with a game-value of 50 points, credits or dollars. Input interface elements not associated with a game value may not defined as game-value interface elements. For example, the "Call Attendant" interface element 1130 may not be defined a game-value interface element.

At 1204, for each of the game-value interface elements, the processor 45 may define a game-value level of heat to be radiated from the touchscreen surface 18. The game-value level of heat may be defined for each of the game-value interface elements. For example, the first input interface element 630a may be a game-value interface element associated with a game-value of 5 points, credits or dollars. The level of heat defined for the first input interface element 630a associated with the value of 5 points, credits or dollars may be a game-value level of heat. In some embodiments, the processor 45 may define a game-value level of heat in absolute terms. That is, each level of heat may be associated with a specific magnitude of heat to be felt by a player feature while contacting the touchscreen surface 18. For example, the first input interface element 630a may be associated with a first level of heat such that when a player feature contacts the touchscreen surface 18, the player feature may detect heat equivalent to 60 degrees Fahrenheit. The second input interface element 630b may be associated with a second level of heat such that when a player feature contacts the touchscreen surface 18, the player feature may detect heat equivalent to 70 degrees Fahrenheit. The third input interface element 630c may be associated with a third level of heat such that when a player feature contacts the touchscreen surface 18, the player feature may detect heat equivalent to 80 degrees Fahrenheit. Lastly, the fourth input interface element 630d may be associated with a fourth level of heat such that when a player feature contacts the touchscreen surface 18, the player feature may detect heat equivalent to 90 degrees Fahrenheit.

Although the first, second, third and fourth level of heat are defined as detected heat equivalent to 60, 70, 80 and 90 degrees Fahrenheit, respectively, in some embodiments the processor 45 may define each level of heat to be any magnitude of heat. Further, in some embodiments, two or more game-value interface elements may be associated with the same level of heat and another two or more game-value interface elements may be associated with different level of heat.

In some embodiments, for each of the game-value interface elements, the processor 45 may define a game-value level of heat for a game-value interface element relative to another game-value interface element. For example, instead of defining a specific magnitude of heat to be felt by a player feature while contacting game-value interface elements 630, the processor 45 may define heat steps. That is, the third input interface element 630c may be associated with a level of heat that is two heat steps greater than the level of heat associated with the first input interface element 630a.

For example, the processor 45 may define a heat step to be the equivalent of 10 degrees Fahrenheit. Further, at a particular point in time during the execution of a game, the first input interface element 630*a* may be associated with a level of heat such that when the player feature contacts the first input interface element 630*a* on the touchscreen surface 18, the player feature may detect heat equivalent to 50 degrees Fahrenheit. Accordingly, the processor 45 may associate the third input interface element 630*c* with a level of heat equivalent to 70 degrees Fahrenheit.

During a progressive game, the first input interface element 630*a* may be associated with a level of detected heat equivalent to 70 degrees Fahrenheit. Accordingly, the processor 45 may associate the third input interface element 630*c* with a level of detected heat equivalent to 90 degrees Fahrenheit. Therefore, in at least some embodiments, the processor 45 may define a greater level of heat for one of the game-value interface elements associated with a greater game value than for another one of the game-value interface elements associated with a lesser game value.

Although game-value interface elements having a greater game-value may be associated with a greater level of heat, in some embodiments, the processor 45 may define levels of heat in an the opposite way. That is, game-value interface elements having a lower game-value may be associated with a greater level of heat. For example, the first input element 630*a*, representing 5 points, credits or dollars, may be associated with a level of heat such that when the player feature contacts the input interface element 630*a*, the player feature may detect heat equivalent to 90 degrees Fahrenheit. Further, the third input interface element 630*c*, representing 20 points, credits or dollars, may be associated with a level of heat such that when the player feature contacts the third input interface element 630*c*, the player feature may detect heat equivalent to 70 degrees Fahrenheit.

By defining a level of heat to be radiated from a touchscreen surface 18 for each of the input interface elements, the EGM 10 supplements visual feedback with haptic feedback. That is, user detection of heat associated with information relating to game-value interface elements provide the user with additional information. For example, the "hotter" the input interface element, the greater game-value points, credits or dollar values.

Radiating Heat Based on Selected Game-Value Interface Element

Figure 13:
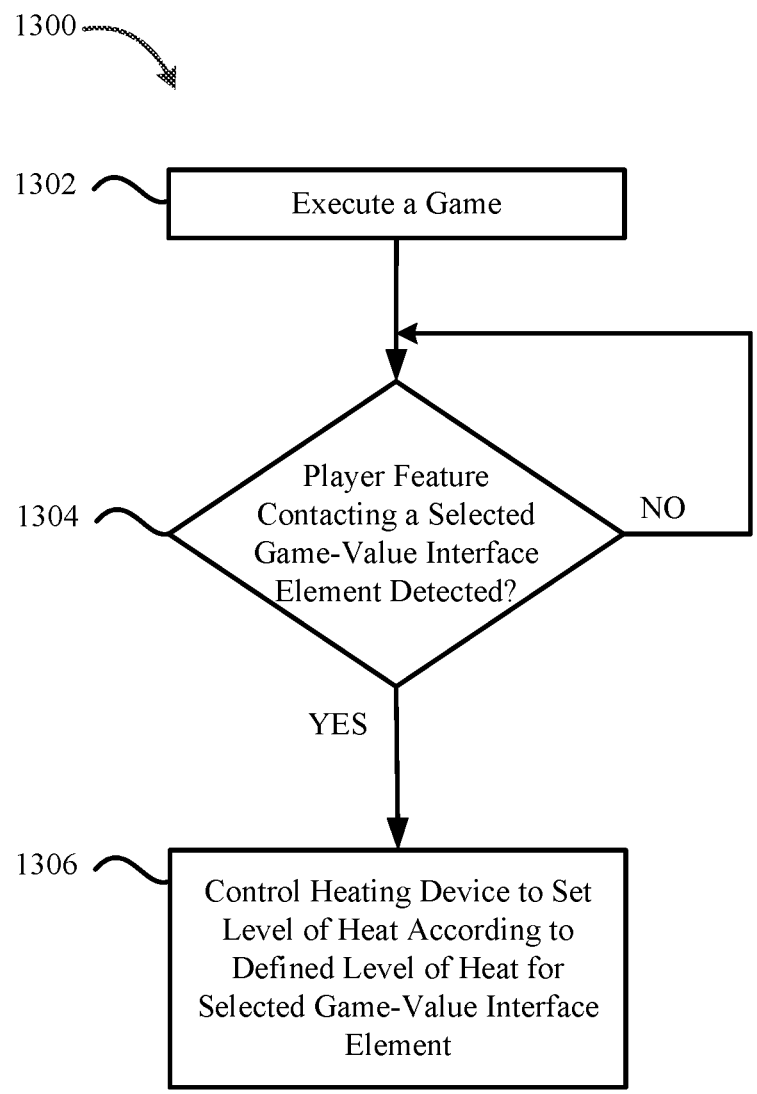
FIG. 13 is a flowchart illustrating an example method for providing haptic feedback.

Reference is now made to FIG. 13 which illustrates an example method 1300 of providing haptic feedback on a touchscreen display. In particular, the method 1300 is a method 1300 for radiating heat from the touchscreen surface 18 according to a user selected game-value interface element. The method 1300 may be performed by the EGM 10 of the type described above with reference to FIGS. 1 to 2, by a host system 41 or server computer 60 described above with reference to FIGS. 2 to 3 or by a variation or combination of such electronic devices. For example, in at least some embodiments, processor executable instructions may configure a processor 45 of a game controller board 44 to perform the method 1300. To describe method 1300, simultaneous reference will be made to FIG. 11.

Similar to method 400 at 402, at 1302, the processor 45 of the EGM 10 game controller board 44 may execute a game. In some embodiments, the processor 45 may provide a at least two game-value interface elements, such as input interface elements 630*a*, 630*b*, 630*c*, 630*d*. The input interface elements 630*a*, 630*b*, 630*c*, 630*d* may be game-value interface elements representing possible bets that a user may make.

At 1304, the processor 45 may detect a game condition. That is, the processor 45 may detect a player feature contacting a selected game-value interface element on the touchscreen surface 18. For example, the processor 45 may detect that a player feature has contacted the input interface element 630*d*.

At 1306, the processor 45 may control the heating device 58 to set a level of heat radiating from the touchscreen surface 18 according to a defined level of heat for the selected game-value interface element. For example, in response to the processor 45 detecting the player feature contacting the fourth input interface element 630*d* associated with 50 credits, the processor 45 may control the heating device 58 to set the level of heat to be detected at the touchscreen surface 18 to be equivalent to 90 degrees Fahrenheit.

Localized Heating from Touchscreen Surface

The embodiments described with reference to FIG. 13 may be useful for an EGM 10 having a heating device 58 that may be capable of setting a level of heat for one touchscreen surface portion or the entirety of the touchscreen surface 18 at any given time. That is, only when the processor 45 detects a player feature contacting an input interface element on the touchscreen surface 18 may the processor 45 set a level of heat radiating from the touchscreen surface 18. It may, however, be desirable for the processor 45 to be able to provide localized heating to two or more portions of the touchscreen surface 18.

Referring again to FIG. 11, as previously described, the game interface 1100 may be provided on a touchscreen surface 18. The touchscreen surface 18 may include two or more touchscreen surface portions, such as touchscreen surface portions 640*a*, 640*b*, 640*c*, 640*d*, 1140. A heating device 58 may be coupled to the two or more touchscreen surface portions. In some embodiments, the heating device 58 may set a different level of heat to be radiated from each of the touchscreen surface portions. Further, at least two of the two or more touchscreen surface portions may be associated with a corresponding game-value interface element. For example, the touchscreen surface portion 640*a* may be associated with the input interface element 630*a* corresponding to 5 points, credits or dollars and the touchscreen surface portion 640*b* may be associated with the input interface element 630*b* corresponding to 10 points, credits or dollars.

In some embodiments, for each of the two or more touchscreen surface portions associated with a game value interface element, the processor 45 may control the heating device to set the level of heat radiating from the touchscreen surface portion according to the defined game-value level of heat for that game-value interface element. Accordingly, at any given point in time, the processor 45 may control the heating device 58 to selectively radiate a different level of heat from each of the touchscreen surface portions associated with each of the game-value interface elements. That is, in addition to the visual indicators with respect to points, credits or dollars associated with the game-value interface elements provided on the touchscreen surface 18, the processor 45 may provide a touchscreen surface 18 with localized heat portions for conveying information to the player. For example, if the player purports to make the maximum allowable bet per game round, the player may identify a game-value interface element (or the touchscreen surface portion) having the "hottest" touch.

Haptic Feedback for Locating a Desirable Outcome

Figure 14:
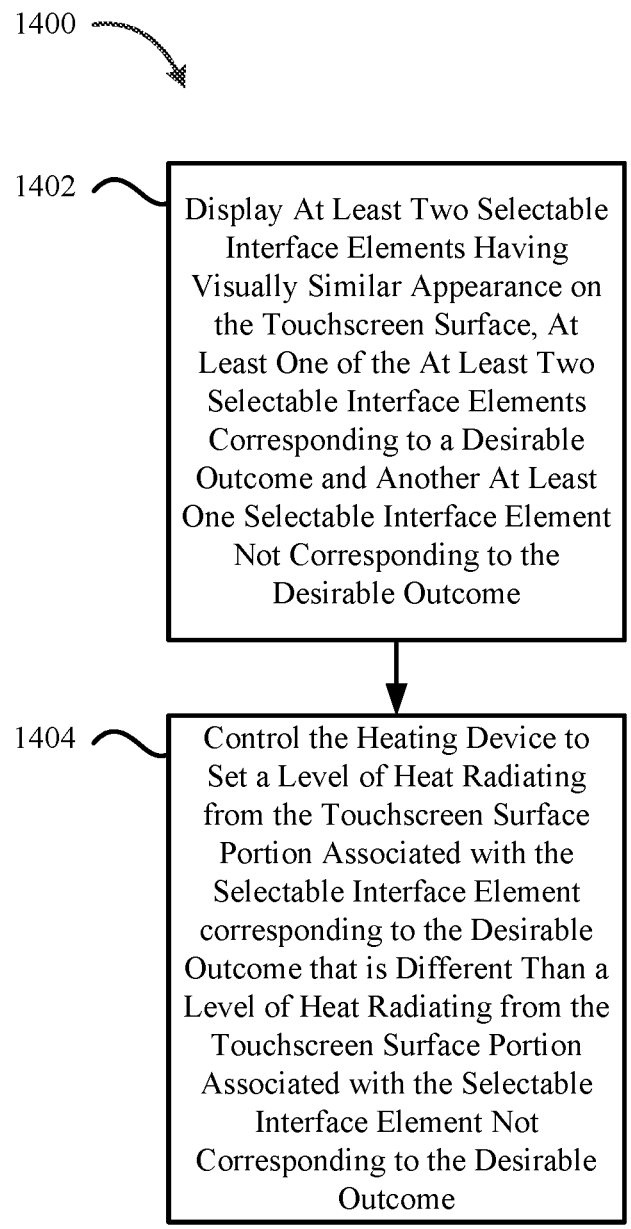
FIG. 14 is a flowchart illustrating an example method for providing haptic feedback.

Reference is now made to FIG. 14 which is an example method 1400 of providing haptic feedback for locating an interface element corresponding to a desirable outcome. The method 1400 may be performed by the EGM 10 of the type described above with reference to FIGS. 1 to 2, by a host system 41 or server computer 60 described above with reference to FIGS. 2 to 3 or a variation or combination of such electronic devices. For example, in at least some embodiments, processor executable instructions may configure a processor 45 of a game controller board 44 to perform the method 1400. To describe the method 1400, simultaneous reference will be made to FIG. 15.

Figure 15:
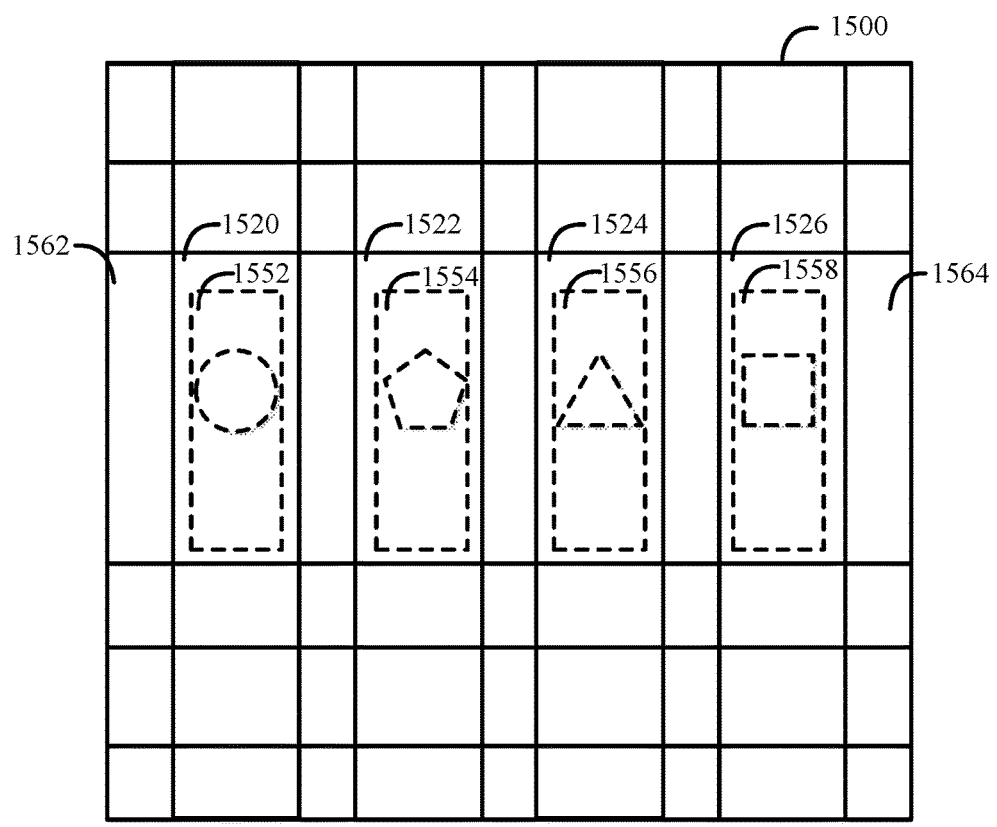
FIG. 15 illustrates an example game interface provided to a player of an EGM.

FIG. 15 illustrates an example game interface 1500 provided on a display 12 of an EGM 10. The display 12 may be a touchscreen having a touchscreen surface 18. The EGM 10 may be of the type described above with reference to FIGS. 1 to 2 or a variation of such an electronic display. For example, the processor 45 may provide the game interface 1500 to a display 12 and a player may view the game interface 1500 from the touchscreen surface 18.

When the game interface 1500 is displayed on the touchscreen surface 18, the touchscreen surface 18 may include two or more touchscreen surface portions 1520, 1522, 1524, 1526, 1562, 1564. Although six touchscreen surface portions are identified and the touchscreen surface portions are illustrated as being generally rectangular in shape, in some embodiments, the touchscreen surface 18 may have any number of touchscreen surface portions having any shape. In some embodiments, a heating device 58 may be coupled to the two or more touchscreen surface portions 1520, 1522, 1524, 1526, 1562, 1564 and the heating device 58 may set a different level of heat to be radiated from each of the touchscreen surface portions.

Further, in some embodiments, at least two of the two more touchscreen surface portions may be associated with selectable interface elements 1552, 1554, 1556, 1558. In some embodiments, the processor 45 may display at least two or more selectable interface elements, where the at least two or more selectable interface elements may be visually similar in appearance on the touchscreen surface 18. In some embodiments, the selectable interface elements 1552, 1554, 1556, 1558 may be visually distinguishable from each other In some embodiments, even though each of the selectable interface elements 1552, 1554, 1556, 1558 may be visually distinguishable from another of the selectable interface elements 1552, 1554, 1556, 1558, a player may be unable to visually determine which of the selectable interface elements may be associated with a desirable outcome. For example, a desirable outcome may include winning a bonus prize. In contrast, an undesired outcome may be the end of the game.

Referring again to FIG. 14, at 1402, the processor 45 may display at least two selectable interface elements having a visually similar appearance on the touchscreen surface 18. For example, as illustrated in FIG. 15, the processor 45 may display the selectable interface elements 1552, 1554, 1556, 1558. At least one of the at least two selectable interface elements may correspond to a desirable outcome and another at least one of the at least two selectable interface elements may not correspond to the desirable outcome. For example, the selectable interface element 1558 on the right hand side of the game interface 1500 may correspond to a desirable outcome, while the other selectable interface elements 1552, 1554, 1556 may not correspond to a desirable outcome.

At 1404, the processor 45 may control the heating device 58 to set a desirable outcome level of heat radiating from the at least one touchscreen surface portions associated with the selectable interface elements corresponding to the desirable outcome that is different than an undesirable outcome level of heat radiating from the at least one touchscreen surface portions associated with the selectable interface elements not corresponding to the desirable outcome. For example, the processor 45 may set a desirable outcome level of heat radiating from the touchscreen surface portion 1526 associated with the selectable interface element 1558 (e.g., associated with desirable outcome) at a higher heat level than for other touchscreen surface portions. That is, the processor 45 may control the heating device 58 to set the desirable outcome level of heat such that heat detected by a player feature contacting the touchscreen surface portion 1526 (e.g., associated with the desirable outcome) may be equivalent to 80 degrees Fahrenheit. Further, the processor 45 may control the heating device 58 to set the undesirable outcome level of heat such that heat detected by a player feature contacting the touchscreen surface portions 1520, 1522, 1524 (e.g. not associated with the desirable outcome) may be equivalent to 60 degrees Fahrenheit.

Accordingly, although the player may be unable to visually determine which of the selectable interface elements 1552, 1554, 1556, 1558 may be associated with a desirable outcome, the processor 45 may control the heating device 58 for providing haptic feedback to the user for locating a desirable outcome. That is, the processor 45 may be configured to provide non-visual information to the player during execution of a game.

Differentiating Selectable and Non-Selectable Interface Elements

The processor 45 may provide a game interface with text and graphics. In some embodiments, the game interface may be densely populated with text and graphics. In some embodiments, a player may find it challenging to quickly discern what elements on a touchscreen surface 18 are selectable (e.g. for interacting with the EGM 10) and which elements are non-selectable.

Referring again to FIG. 15, the touchscreen surface 18 may include two or more touchscreen surface portions 1520, 1522, 1524, 1526, 1562, 1564. The game interface 1500 may be provided to the display 12 and viewable from the touchscreen surface 18. For ease of explanation and illustration, certain portions of the game interface 1500 may not be illustrated so that other aspects of the game interface 1500 may be more apparent.

As described above, the touchscreen surface portions 1520, 1522, 1524, 1526 may be associated with selectable interface elements 1552, 1554, 1556, 1558. Further, touchscreen surface portions 1562, 1564 may not be associated with selectable interface elements. For example, parts of the game interface 1500 not associated with selectable interface elements may include background graphics or text.

In some embodiments, the processor 45 may control the heating device 58 to set a level of heat radiating from the at least one of the two or more touchscreen surface portions associated with a selectable interface element to thermally distinguish the selectable interface element from the non-selectable interface element. That is, the processor 45 may set a level of heat radiating from the at least one of the two or more touchscreen surface portions associated with the selectable interface element to be higher than the level of heat radiating from the at least one of the two or more touchscreen surface portions associated with the non-selectable element. For example, the processor 45 may set a level of heat radiating from the touchscreen surface portions associated with selectable interface elements (e.g., selectable interface elements 1552, 1554, 1556, 1558) to be the equivalent of 80 degrees Fahrenheit, while the processor 45 may set a level of heat radiating from the touchscreen surface portions associated with the non-selectable interface elements to be the equivalent of 60 degrees Fahrenheit.

Accordingly, the touchscreen surface 18 may include several localized touchscreen portions for radiating heat from the touchscreen surface 18. Haptic feedback may be provided to assist the player in distinguishing selectable interface elements (e.g., warmer feeling elements) from game interface elements not associated with selectable interface elements (e.g., relatively cooler feeling elements).

In some embodiments, the processor 45 may control a heating device 58 including a thermoelectric or piezoelectric device. The processor 45 may control the heating device 58 to withdraw heat from the at least one of the two or more touch screen surface portions associated with the non-selectable interface element. That is, the processor 45 may control the heating device 58 to transfer heat from the touchscreen surface portions associated with non-selectable interface elements to touchscreen surface portions associated with selectable interface elements.

In some embodiments, the processor 45 may utilize the camera 16 to determine a location of a player feature near or hovering over the display 12 and control the heating device 58 to set a level of heat radiating from the touchscreen surface 18. For example, the processor 45 may determine based on data from the camera 16 that the player feature may be hovering over an input interface element 630 displayed on the touchscreen surface 18, such as a first input interface element 630a associated with a first touchscreen portion 640a. In anticipation of the player feature contacting the first input interface element 630a, the processor 45 may control the heating device 58 to set a level of heat associated with the first input interface element 630a. Accordingly, the processor 45 may utilize data from the camera 16 to control the heating device 58 to pre-empt or predict required heat levels radiating from the touchscreen surface 18 and the response times relating to changes in heat levels radiating from the touchscreen surface 18 may be reduced.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, it will be obvious to those skilled in the art that changes and modifications may be made without departing from this invention in its broader aspects. The appended claims are to encompass within their scope all such changes and modifications.

What is claimed is:

1. An electronic gaming machine for providing a game to a player, the electronic gaming machine comprising:
 a touchscreen having a touchscreen surface;
 a heating device coupled to the touchscreen to selectively radiate heat from the touchscreen surface; and
 a processor coupled to the touchscreen and to the heating device, the processor configured to:
 detect a game condition associated with the game; and
 in response to detecting the game condition, control the heating device to set a level of heat radiating from the touchscreen surface,
 wherein the detected game condition includes an instruction to guide a player feature towards a target interface element, wherein the processor is further configured to:
 provide the target interface element; and
 wherein controlling the heating device comprises:
  detecting the player feature contacting the touchscreen surface at a first location;
  controlling the heating device to set a first heat level in response to detecting the player feature at the first location;
  detecting the player feature contacting the touchscreen surface at a second location;

determining whether the second location is nearer to the target interface element than the first location; and in response to determining the second location is nearer to the target interface element than the first location, controlling the heating device to increase the level of heat radiating from the touchscreen surface.

2. The electronic gaming machine of claim 1, wherein the detected game condition includes an instruction to display a game animation, wherein the processor is further configured to display the game animation on the screen; and wherein controlling the heating device comprises, while displaying the game animation, controlling the heating device to alter the level of heat radiating from the touchscreen surface according to one or more features of the displayed game animation.

3. The electronic gaming machine of claim 1, wherein the detected game condition includes an instruction to provide a game status level update, wherein the processor is further configured to:

determine a current heat level associated with a current game status level;

determine a points tally to determine whether the play has collected a pre-determined number of points to advance to a subsequent game level; and wherein controlling the heating device comprises:

in response to determining that the player has collected the pre-determined number of points to advance to the subsequent game level, controlling the heating device to increase the level of heat radiating from the touchscreen surface, the increased level of heat corresponding to the subsequent game level.

4. The electronic gaming machine of claim 1, wherein the provided target interface element is not displayed on the touchscreen surface.

5. The electronic gaming machine of claim 1, wherein the processor is configured to provide two or more game value interface elements on the touchscreen surface, each game value interface element corresponding to a game value, and wherein controlling the heating device further comprises:

setting a first game-value level of heat to be radiated from a first game value touchscreen surface portion of the touchscreen surface based on the first game value; and setting a second game-value level of heat to be radiated from a second game value touchscreen surface portion of the touchscreen surface based on the second game value.

6. The electronic gaming machine of claim 5, wherein controlling the heating device further comprises:

determining that the first game value is greater than the second game value; and setting the first game-value level of heat to be radiated from the first game value touchscreen surface portion to be higher than the second game-value level of heat to be radiated from the second game value touchscreen surface portion.

7. The electronic gaming machine of claim 5, wherein detecting the game condition comprises:

detecting a player feature contacting a selected first game value touchscreen surface portion on the touchscreen surface; and wherein controlling the heating device comprises:

in response to detecting contact with the selected first game value touchscreen surface portion, setting the level of heat radiating from the first game value touchscreen surface portion according to the defined first game-value level of heat to be radiated from the first game value touchscreen surface portion.

8. The electronic gaming machine of claim 1, wherein the touchscreen surface includes two or more touchscreen surface portions including a first touchscreen surface portion associated with a desirable selectable interface element that the user desires and a second touchscreen surface portion associated with an undesirable selectable interface element not corresponding to the desirable outcome, the desirable selectable interface element having a visually similar appearance to the undesirable selectable interface element.

9. The electronic gaming machine of claim 1, wherein controlling the heating device further comprises:

withdrawing heat from the touch screen surface.

10. A method for providing a game to a player at an electronic gaming machine, the electronic gaming machine comprising a touchscreen having a touchscreen surface and a heating device coupled to the touchscreen to selectively radiate heat from the touchscreen surface, the method comprising:

detecting a game condition associated with the game; and in response to detecting the game condition, controlling the heating device to set a level of heat radiating from the touchscreen surface, wherein the detected game condition includes an instruction to guide a player feature towards a target interface element, the method further comprising:

providing the target interface element; and wherein controlling the heating device comprises:

detecting the player feature contacting the touchscreen surface at a first location;

controlling the heating device to set a first heat level in response to detecting the player feature at the first location;

detecting the player feature contacting the touchscreen surface at a second location;

determining whether the second location is nearer to the target interface element than the first location; and in response to determining the second location is nearer to the target interface element than the first location, controlling the heating device to increase the level of heat radiating from the touchscreen surface.

11. The method of claim 10, wherein the detected game condition includes an instruction to display a game animation, the method further comprising:

displaying the game animation on the touchscreen; and wherein controlling the heating device comprises:

while displaying the game animation, controlling the heating device to alter the level of heat radiating from the touchscreen surface according to one or more features of the displayed game animation.

12. The method of claim 10, wherein the detected game condition includes an instruction to provide a game status level update, the method further comprising:

determining a current heat level associated with a current game status level;

determining a points tally to determine whether the player has collected a pre-determined number of points to advance to a subsequent game level; and wherein controlling the heating device comprises:

in response to determining that the player has collected the pre-determined number of points to advance to the subsequent game level, controlling the heating device to increase the level of heat radiating from the touchscreen surface, the increased level of heat corresponding to the subsequent game level.

13. The method of claim 10, the method further comprising:
provide two or more interface elements on the touchscreen surface, at least two of the two or more interface elements being game-value interface elements corresponding to a game value; and
wherein controlling the heating device comprises:
for each of the game-value interface elements, defining a game-value level of heat to be radiated from the touchscreen surface.

14. The method of claim 13, wherein defining the game-value level of heat to be radiated for each of the game-value interface elements comprises:
defining a greater level of heat for one of the game-value interface elements associated with a greater game value than for another one of the game-value interface elements associated with a letter game value.

15. The method of claim 13, wherein detecting the game condition comprises:
detecting a player feature contacting a selected game-value interface element on the touchscreen surface, the selected game-value interface element from the at least two game-value interface elements; and
wherein controlling the heating device comprises:
in response to detecting contact with the selected game-value interface element, setting the level of heat radiating from the touchscreen surface according to the defined game-value level of heat for the selected game-value interface element.

16. The method of claim 13, wherein the touchscreen surface includes two or more touchscreen surface portions, and at least two of the two or more touchscreen surface portions being associated with a corresponding game-value interface element,
wherein the heating device is coupled to the two or more touchscreen surface portions, and
wherein controlling the heating device comprises:
for each of the two or more touchscreen surface portions associated with a game value interface element, controlling the heating device to set the level of heat radiating from that touchscreen surface portion according to the defined game-value level of heat for that game-value interface element.

17. The method of claim 10, wherein the touchscreen surface includes two or more touchscreen surface portions, and at least two of the two or more touchscreen surface portions being associated with selectable interface elements, wherein the heating device is coupled to the two or more touchscreen surface portions, the method further comprising:
displaying at least two selectable interface elements having a visually similar appearance on the touchscreen surf ace, at least one of the at least two selectable interface elements corresponding to a desirable outcome that is an outcome that the user desires and another at least one of the at least two selectable interface elements not corresponding to the desirable outcome; and
wherein controlling the heating device comprises:
setting a desirable outcome level of heat radiating from the at least one touchscreen surface portions associated with the selectable interface element corresponding to the desirable outcome that is different than an undesirable outcome level of heat radiating from the at least one touchscreen surface portions associated with the selectable interface elements not corresponding to the desirable outcome.

18. The method of claim 10, wherein the touchscreen surface includes two or more touchscreen surface portions, and at least one of the two or more touchscreen surface portions is associated with a selectable interface element and at least one of the two or more touch screen surface portions is associated with a non-selectable interface element,
wherein the heating device is coupled to the two or more touchscreen surface portions, and
wherein controlling the heating device comprises:
setting a level of heat radiating from the at least one of the two or more touchscreen surface portions associated with the selectable interface element to be higher than the level of heat radiating from the at least one of the two or more touchscreen surface portions associated with the non-selectable element.

19. The method of claim 18, wherein controlling the heating device further comprises:
withdrawing heat from the at least one of the two or more touch screen surface portions associated with the non-selectable interface element.

* * * * *